United States Patent
Jin et al.

(10) Patent No.: US 11,994,913 B2
(45) Date of Patent: May 28, 2024

(54) DISPLAY DEVICE

(71) Applicant: Samsung Display Co., Ltd., Yongin-si (KR)

(72) Inventors: Byoung Jin Jin, Yongin-si (KR); Jingyu Sim, Suwon-si (KR); Cheuljin Park, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/828,287

(22) Filed: May 31, 2022

(65) Prior Publication Data

US 2023/0044285 A1 Feb. 9, 2023

(30) Foreign Application Priority Data

Aug. 3, 2021 (KR) ........................ 10-2021-0101689

(51) Int. Cl.
G06F 1/16 (2006.01)

(52) U.S. Cl.
CPC ................................. *G06F 1/1652* (2013.01)

(58) Field of Classification Search
CPC .... G06F 1/1652; G06F 1/1601; G06F 1/1605; G06F 2203/04102; G09F 9/301; H04M 1/0268

See application file for complete search history.

(56) References Cited

U.S. PATENT DOCUMENTS

| | | | | |
|---|---|---|---|---|
| 9,123,290 B1 * | 9/2015 | Cho | ...................... | G06F 1/1652 |
| 9,843,758 B2 * | 12/2017 | Park | ........................ | G09G 3/20 |
| 9,860,353 B2 * | 1/2018 | Lee | .................... | H04M 1/0268 |
| 9,978,293 B2 * | 5/2018 | Cho | .......................... | G06F 1/16 |
| 10,476,011 B2 * | 11/2019 | Kang | ................ | G02F 1/133308 |
| 10,750,625 B2 | 8/2020 | Park | | |
| 10,917,985 B1 * | 2/2021 | Lee | ..................... | H05K 5/0017 |
| 11,057,707 B2 | 7/2021 | Kim | | |
| 11,204,631 B2 * | 12/2021 | Mehandjiysky | ........ | G09F 9/301 |
| 11,526,198 B1 * | 12/2022 | Kanas | ................... | G06F 1/1624 |
| 2007/0108791 A1 | 5/2007 | Okninski | | |
| 2015/0192952 A1 * | 7/2015 | Jung | ..................... | G06F 1/1652 |
| | | | | 361/747 |
| 2016/0324021 A1 * | 11/2016 | Takayanagi | .......... | G06F 1/1652 |
| 2018/0160554 A1 * | 6/2018 | Kang | .................. | H05K 5/0017 |
| 2018/0226001 A1 * | 8/2018 | Chen | ....................... | G09F 19/02 |

(Continued)

FOREIGN PATENT DOCUMENTS

| CN | 113163034 A | 7/2021 |
|---|---|---|
| JP | 2021067708 A | 4/2021 |

(Continued)

*Primary Examiner* — Rockshana D Chowdhury
(74) *Attorney, Agent, or Firm* — CANTOR COLBURN LLP

(57) ABSTRACT

A display device includes a display module, a roller connected to a first end of the display module, a plurality of blocks on a rear surface of the display module and connected to a second end of the display module opposite the first end, a first gear connected to an $h^{th}$ block among the plurality of blocks, a second gear connected to an $(h+1)^{th}$ block among the plurality of blocks and engaged with the first gear, and a drive belt configured to transmit a driving force to the second gear.

22 Claims, 33 Drawing Sheets

(56) References Cited

U.S. PATENT DOCUMENTS

| | | | |
|---|---|---|---|
| 2018/0259160 A1* | 9/2018 | Chen | F21V 14/02 |
| 2020/0212326 A1 | 7/2020 | Eom | |
| 2021/0037664 A1* | 2/2021 | Sun | H05K 5/0226 |
| 2021/0141587 A1* | 5/2021 | Cho | G06F 3/16 |
| 2022/0166861 A1* | 5/2022 | Lim | G06F 1/1624 |
| 2022/0400562 A1* | 12/2022 | Wang | G06F 1/1681 |

FOREIGN PATENT DOCUMENTS

| | | |
|---|---|---|
| KR | 10-1758835 B1 | 7/2017 |
| KR | 1020200025152 A | 3/2020 |
| KR | 1020200036409 A | 4/2020 |
| KR | 1020200080020 A | 7/2020 |
| KR | 1020210053100 A | 5/2021 |

\* cited by examiner

DISPLAY DEVICE

This application claims priority to Korean Patent Application No. 10-2021-0101689 filed on Aug. 3, 2021, and all the benefits accruing therefrom under 35 U.S.C. § 119, the disclosures of which are incorporated by reference herein in their entireties.

BACKGROUND

(1) Field

Embodiments described herein relate to a display device.

(2) Description of the Related Art

Electronic devices, such as a smart phone, a digital camera, a notebook computer, a navigation device, a smart television, and the like, which provide an image to a user, include a display device for displaying an image. The display device generates an image and provides the generated image to the user through a display screen.

With the development of display device technologies, various forms of display devices have been developed. For example, various flexible display devices that are curvable, foldable or rollable have been developed. The flexible display devices may be easy to carry and may improve user convenience.

The shapes of flexible display panels used for the flexible display devices may be diversely modified. For example, a display panel may be connected to a roller and may be wound around, or unwound from, the roller. A structure is provided for raising and lowering the display panel when the display panel is wound or unwound.

SUMMARY

Embodiments provide a display device including a lifting part for more accurately raising and lowering a display module.

According to an embodiment, a display device includes a display module, a roller connected to a first end of the display module, a plurality of blocks on a rear surface of the display module and connected to a second end of the display module opposite the first end, a first gear connected to an $h^{th}$ block among the plurality of blocks, a second gear connected to an $(h+1)^{th}$ block among the plurality of blocks and engaged with the first gear, and a drive belt configured to transmit a driving force to the second gear.

According to an embodiment, a display device includes a display module, a roller connected to a first end of the display module, a plurality of blocks on a rear surface of the display module and connected to a second end of the display module opposite the first end, a first gear connected to an $h^{th}$ block among the plurality of blocks, and a second gear connected to an $(h+1)^{th}$ block among the plurality of blocks and engaged with the first gear. The first end and the second end of the display module are opposite to each other along a first direction, the first gear extends along the first direction, and the second gear is engaged with the first gear in a second direction crossing the first direction and rotates to move the first gear along the first direction.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
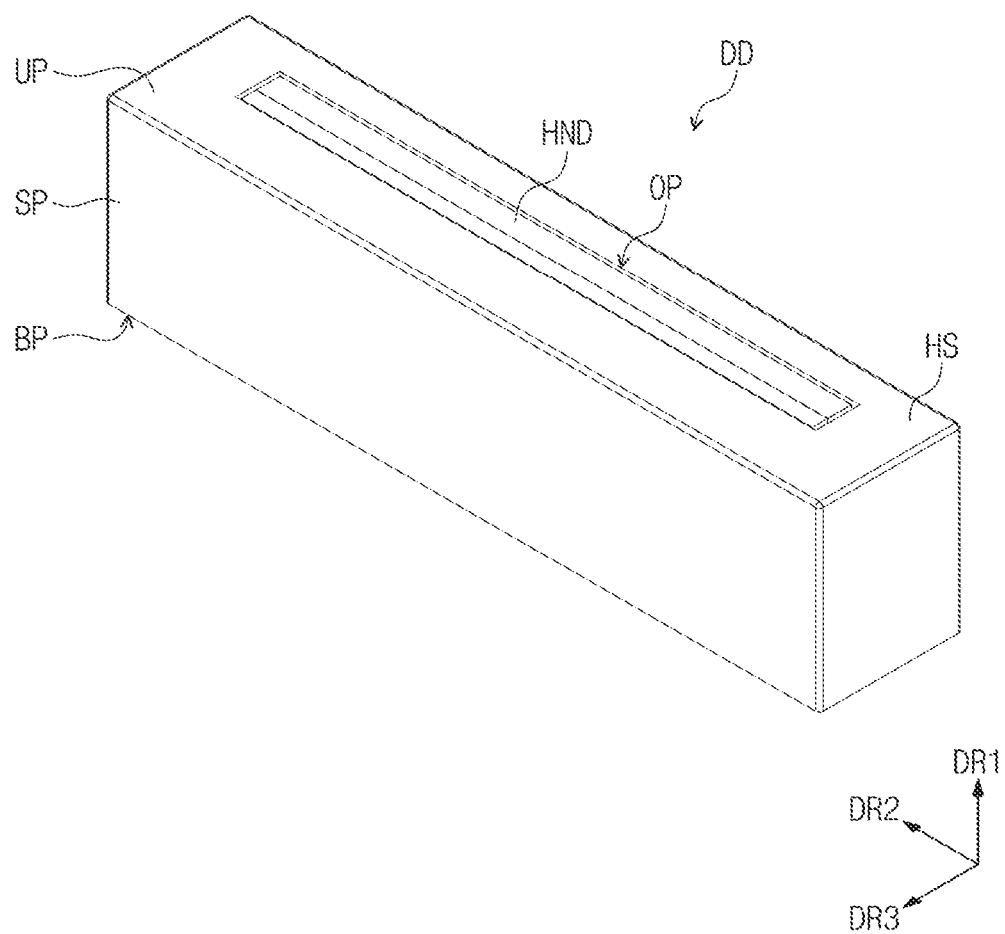
FIG. 1 is a perspective view of an embodiment of a display device.

In the invention, various modifications can be made, various forms can be used, and embodiments will be illustrated in the drawings and described in detail in the text. However, this is not intended to limit the invention to a specific form disclosed, and it will be understood that all changes, equivalents, or substitutes which fall in the spirit and technical scope of the invention should be included.

In this specification, when it is mentioned that a component (or, an area, a layer, a part, etc.) is referred to as being related to another component such as being "on", "connected to" or "coupled to" another component, this means that the component may be directly on, connected to, or coupled to the other component or a third component may be present therebetween. In contrast, when it is mentioned that a component (or, an area, a layer, a part, etc.) is referred to as being related to another component such as being "directly on", "directly connected to" or "directly coupled to" another component, this means that the no component is present therebetween.

Identical reference numerals refer to identical components. Additionally, in the drawings, the thicknesses, proportions, and dimensions of components are exaggerated for effective description.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component.

The terms of a singular form may include plural forms unless otherwise specified. As used herein, a reference number may indicate a singular element or a plurality of the element. For example, a reference number labeling a singular form of an element within the drawing figures may be used to reference a plurality of the singular element within the text of specification.

In addition, terms such as "below", "under", "above", and "over" are used to describe a relationship of components illustrated in the drawings. The terms are relative concepts and are described based on directions illustrated in the drawing.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments will be described with reference to the accompanying drawings.

Figure 2:
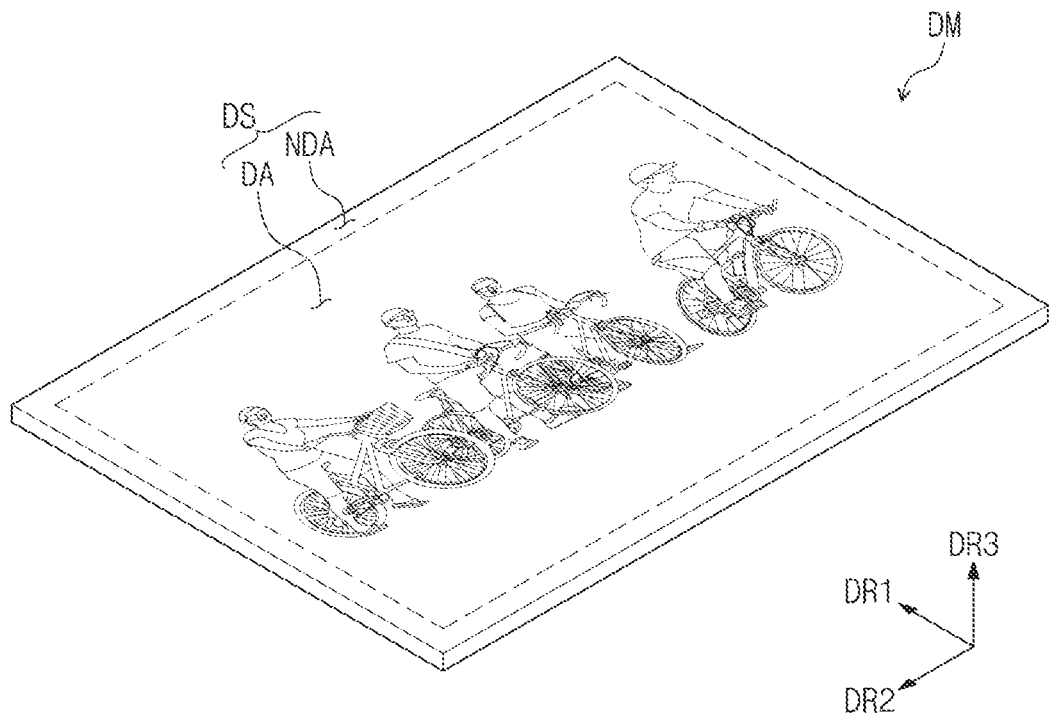
FIG. 2 is a view illustrating an embodiment of a display module accommodated in a housing illustrated in FIG. 1.
Figure 3:
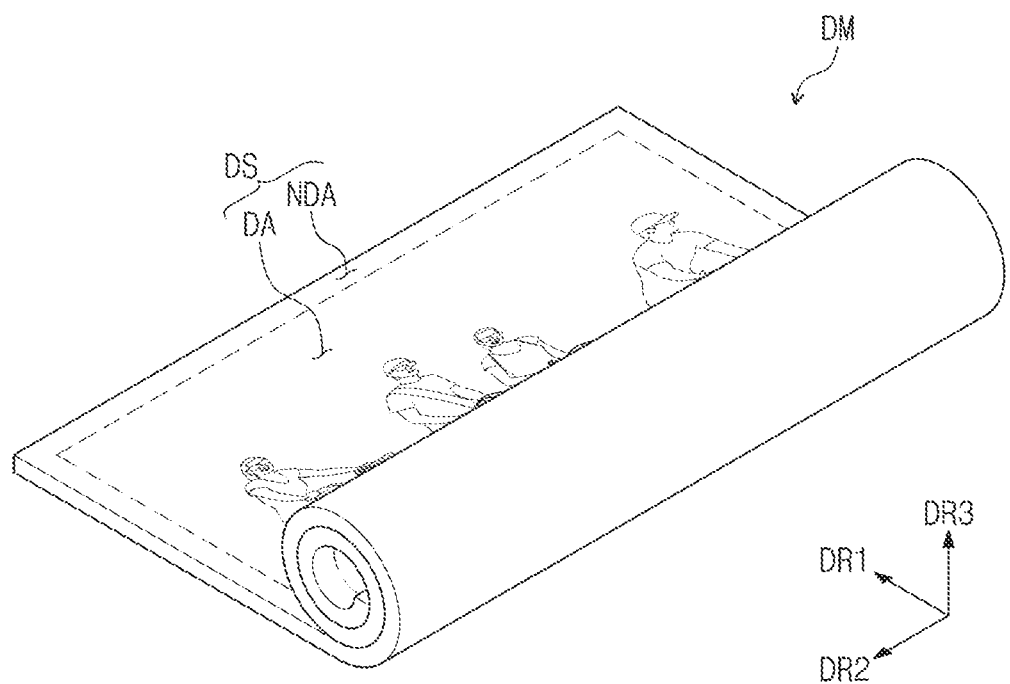
FIG. 3 is a view illustrating an embodiment of the display module illustrated in FIG. 2 which is rolled.

FIG. 1 is a perspective view of an embodiment of a display device DD. FIG. 2 is a view illustrating an embodiment of a display module DM which is flat (or unrolled) accommodated in a housing HS illustrated in FIG. 1. FIG. 3 is a view illustrating an embodiment of the display module DM illustrated in FIG. 2 which rolled.

Referring to FIGS. 1 and 2, the display device DD may include the housing HS, an upper support part HND, and the display module DM. An opening OP may be defined in or by the housing HS. The opening OP may be open to outside the housing HS in a first direction DR1. The housing HS may extend in a second direction DR2 crossing the first direction DR1. Hereinafter, a direction crossing a plane defined by the first and second directions DR1 and DR2 is defined as a third direction DR3.

The upper support part HND may be disposed in the opening OP. The upper support part HND may move toward or away from the housing HS in (or along) the first direction DR1.

The housing HS may include a bottom part BP, an upper part UP, and sidewall parts SP. The opening OP may be defined in the upper part UP. Each of the bottom part BP and the upper part UP may have a plane (e.g., extend along a plane or be parallel to the plane) defined by the second and third directions DR2 and DR3. The bottom part BP and the upper part UP may face each other in the first direction DR1. The sidewall parts SP may extend from the periphery of the bottom part BP to the periphery of the upper part UP, such as to connect the bottom part BP to the upper part UP, without being limited thereto.

The display module DM may be accommodated in the housing HS. The display module DM may have a plane defined by the first and second directions DR1 and DR2. The display module DM may have a rectangular shape with short sides extending in the first direction DR1 and long sides extending in the second direction DR2. However, without being limited thereto, the display module DM may have various shapes such as a circular shape, a polygonal shape, and the like.

An upper surface of the display module DM may be defined as a display surface DS. The upper surface of the display module DM may have a plane defined by the first direction DR1 and the second direction DR2. An image generated by the display module DM may be provided to a user (or to outside the display device DD) through the display surface DS.

The display surface DS may include a display area DA and a non-display area NDA which is adjacent to the display area DA such as being around the display area DA. The display area DA may display an image, and the non-display area NDA may not display an image. The non-display area NDA may surround the display area DA and may define a border of the display module DM, The border may be printed in a predetermined color. Various components or layers of the display device DD may include a display area DA and a non-display area NDA corresponding to those described above.

Although not illustrated, function buttons may be disposed on the housing HS. The function buttons may provide various functions to the display device DD. The display module DM may be movable out of and into the housing HS. In an embodiment, for example, the display module DM may move out of or into the housing HS by operations of the function buttons. Furthermore, the luminance and definition of an image displayed on the display module DM may be controlled by operations of the function buttons.

Referring to FIG. 3, the display module DM may be a flexible display module. The display module DM may be curvable, foldable or rollable. The display module DM may be rolled into the shape of a roll. The display module DM may be rolled in the first direction DR1. The display module DM may be rolled in a direction from one side thereof. The display module DM may be rolled such that the display surface DS faces toward the inside.

Figure 4:
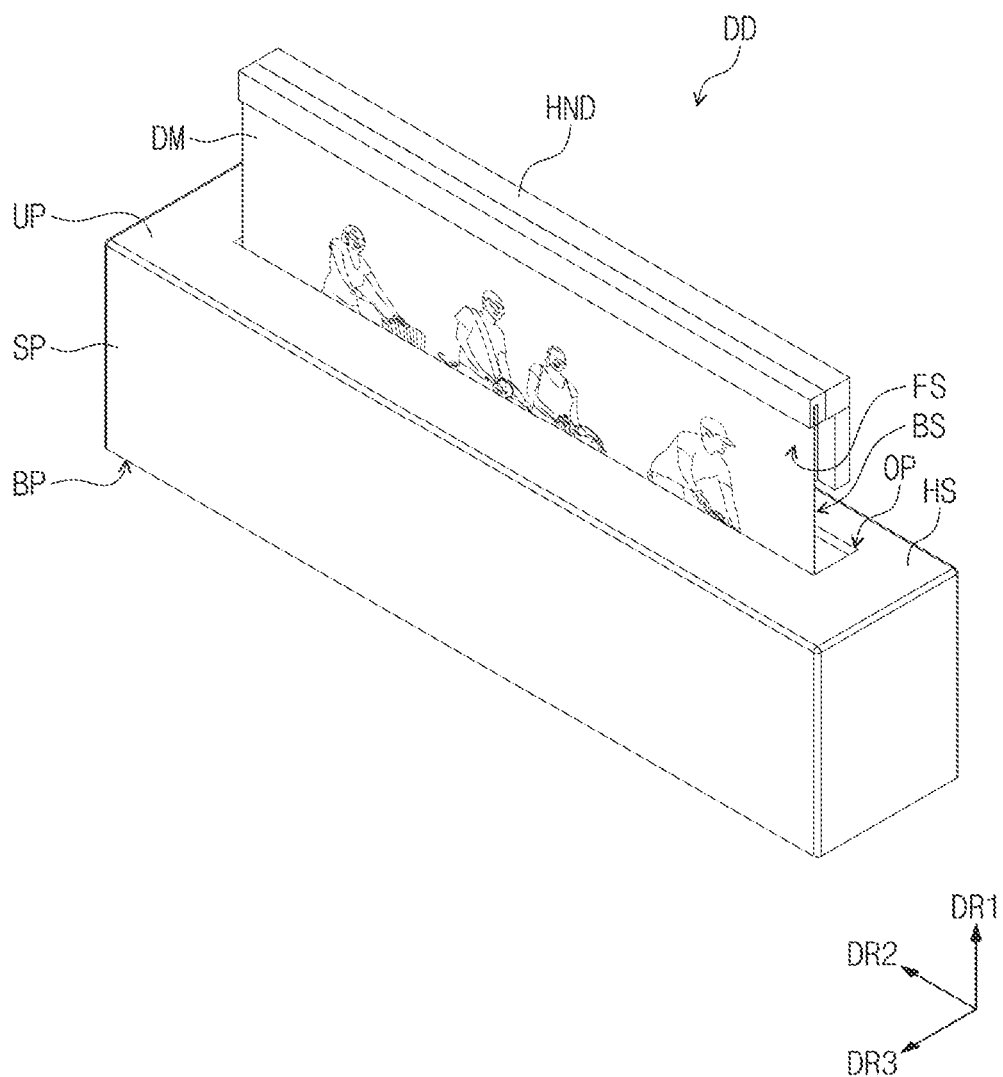
FIGS. 4 and 5 are views illustrating an embodiment of the display module exposed outside the housing illustrated in FIG. 1.
Figure 5:
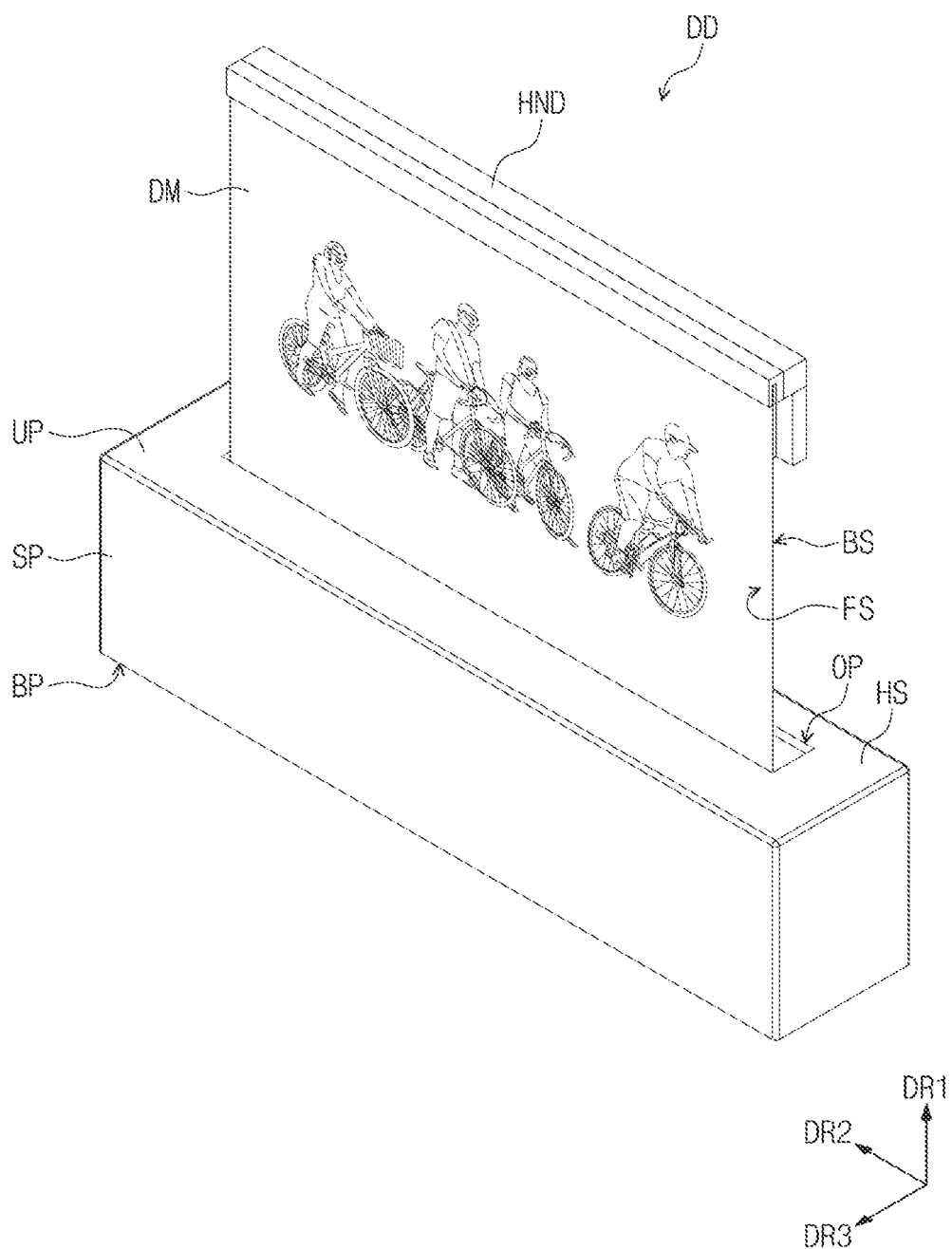

FIGS. 4 and 5 are views illustrating embodiments of the display module DM which is exposed outside the housing HS illustrated in FIG. 1.

Referring to FIGS. 4 and 5, an upper end of the display module DM which is farthest in the first direction DR1 may be connected to the upper support part HND. As the upper support part HND moves away from the housing HS in the first direction DR1, the display module DM may be extracted from the housing HS to the outside through the opening OP. That is, the display module DM is moveable together with the upper support part HND.

The display module DM may be extended out of the housing HS at the opening OP and exposed to outside the housing HS, by operation or movement of the upper support part HND. A front surface FS of the display module DM may be exposed outside the housing HS. The front surface FS may be the above-described display surface DS. A surface facing away from the front surface FS of the display module DM may be defined as a rear surface BS of the display module DM. The front surface FS and the rear surface BS of the display module DM may be surfaces of the display module DM opposite to each other in the third direction DR3.

When the upper support part HND moves toward the housing HS in a direction opposite to the first direction DR1, the display module DM may be retracted into the housing HS through the opening OP illustrated in FIG. 1. Accordingly, the display module DM which is retracted may be located in the housing HS so that the display module DM may not be exposed to the outside of the housing HS.

Figure 6:
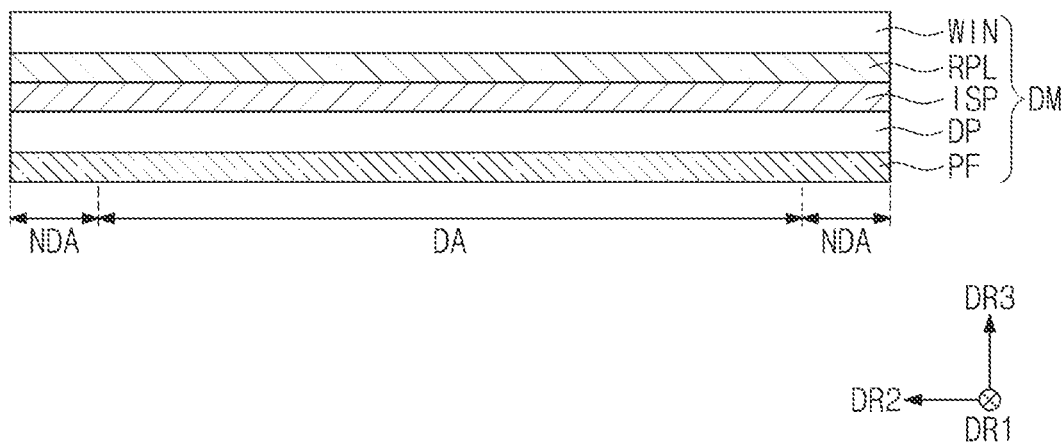
FIG. 6 is a view illustrating an embodiment of a section of the display module illustrated in FIG. 2.

FIG. 6 is a view illustrating a cross-section of an embodiment of the display module DM illustrated in FIG. 2.

In FIG. 6, a view of the display module DM in the first direction DR1 is illustrated.

Referring to FIG. 6, the display module DM may include a display panel DP, an input sensing part ISP, an anti-reflection layer RPL, a window WIN, and a panel protection film PF.

The display panel DP may be a flexible display panel. The display panel DP may be an emissive display panel and is not particularly limited. In an embodiment, for example, the display panel DP may be an organic light emitting display panel or an inorganic light emitting display panel. An emissive layer of the organic light emitting display panel may contain (or include) an organic light emitting material. An emissive layer of the inorganic light emitting display panel may contain quantum dots, quantum rods, and the like.

Hereinafter, it will be exemplified that the display panel DP is an organic light emitting display panel.

The input sensing part ISP may be disposed on the display panel DP. The input sensing part ISP may include a plurality of sensor units (not illustrated) for sensing an external input using a capacitive sensing technique. The input sensing part ISP may be directly on the display panel DP in manufacture (or providing) of the display module DM. However, without being limited thereto, the input sensing part ISP may be a panel separate from the display panel DP and may be attached to the display panel DP by an intervening member such as an adhesive layer.

The anti-reflection layer RPL may be disposed on the input sensing part ISP. The anti-reflection layer RPL may be directly on the input sensing part ISP, or may be coupled to the input sensing part ISP by an adhesive layer. The anti-reflection layer RPL may be defined as a film for reducing (or effectively preventing) reflection of external light. The anti-reflection layer RPL may decrease the reflectivity of external light incident toward the display panel DP from above the display device DD.

When external light travelling toward the display panel DP is reflected by the display panel DP and provided back to outside the display panel DP (or the display device DD) such as to an external user, the external light may be recognized such as in a mirror. To prevent such a phenomenon, the anti-reflection layer RPL may include a plurality of color filters that display the same colors as pixels PX of the display panel DP.

External light may be filtered in the same colors as those of the pixels PX by the color filters. In this case, the external light may not be visible to the user (or from outside the display panel DP). However, without being limited thereto, the anti-reflection layer RPL may include a polarizer film for decreasing the reflectivity of external light. The polarizer film may include a phase retarder and/or a polarizer.

The window WIN may be disposed on the anti-reflection layer RPL. The window WIN may be directly on the anti-reflection layer RPL, or may be coupled to the anti-reflection layer RPL by an adhesive layer. The window WIN may protect the display panel DP, the input sensing part ISP, and the anti-reflection layer RPL from external scratches and shocks.

The panel protection film PF may be disposed under the display panel DP. The panel protection film PF may be directly on the bottom of the display panel DP, or may be coupled to the display panel DP by an adhesive layer. The panel protection film PF may protect a lower portion of the display panel DP. The panel protection film PF may contain a flexible plastic material such as polyethylene terephthalate (PET). The panel protection film PF may face the input sensing part ISP, the anti-reflection layer RPL and the window WIN, with the display panel DP therebetween.

Figure 7:
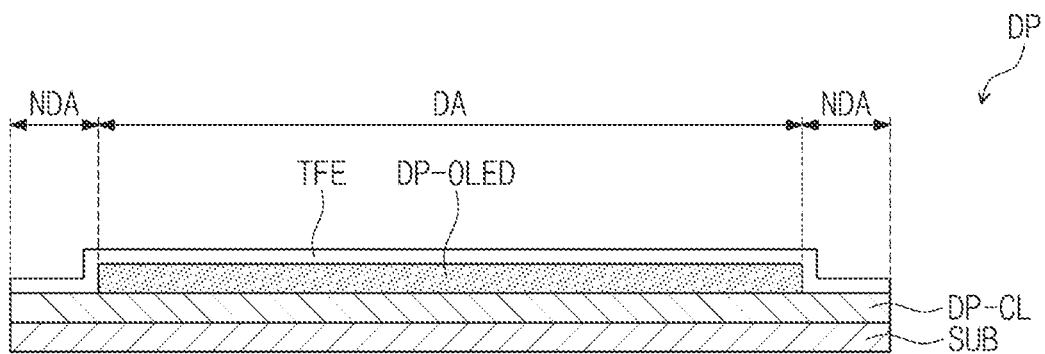
FIG. 7 is a view illustrating an embodiment of a section of a display panel illustrated in FIG. 6.

FIG. 7 is a view illustrating a cross-section of an embodiment of the display panel DP illustrated in FIG. 6.

In FIG. 7, a cross-section of the display panel DP viewed in the first direction DR1 is illustrated.

Referring to FIG. 7, the display panel DP may include a substrate SUB, a circuit element layer DP-CL disposed on the substrate SUB, a display element layer DP-OLED disposed on the circuit element layer DP-CL, and a thin-film encapsulation layer TFE disposed on the display element layer DP-OLED. That is, the circuit element layer DP-CL, the display element layer DP-OLED and the thin-film encapsulation layer TFE may be in order from the substrate SUB.

The substrate SUB may include a display area DA and a non-display area NDA which is adjacent to the display area DA. The substrate SUB may contain a flexible plastic material such as polyimide (PI). The display element layer DP-OLED may be disposed on the display area DA.

A plurality of pixels PX may be disposed in the display area DA. Each of the pixels PX may include a light emitting element that is connected to a transistor disposed in the circuit element layer DP-CL, and is disposed in the display element layer DP-OLED.

The thin-film encapsulation layer TFE may be disposed on the circuit element layer DP-CL to cover the display element layer DP-OLED. The thin-film encapsulation layer TFE may include inorganic layers and an organic layer which is between the inorganic layers. The inorganic layers may protect the pixels PX from moisture/oxygen. The organic layer may protect the pixels PX from foreign matter such as dust particles.

Figure 8:
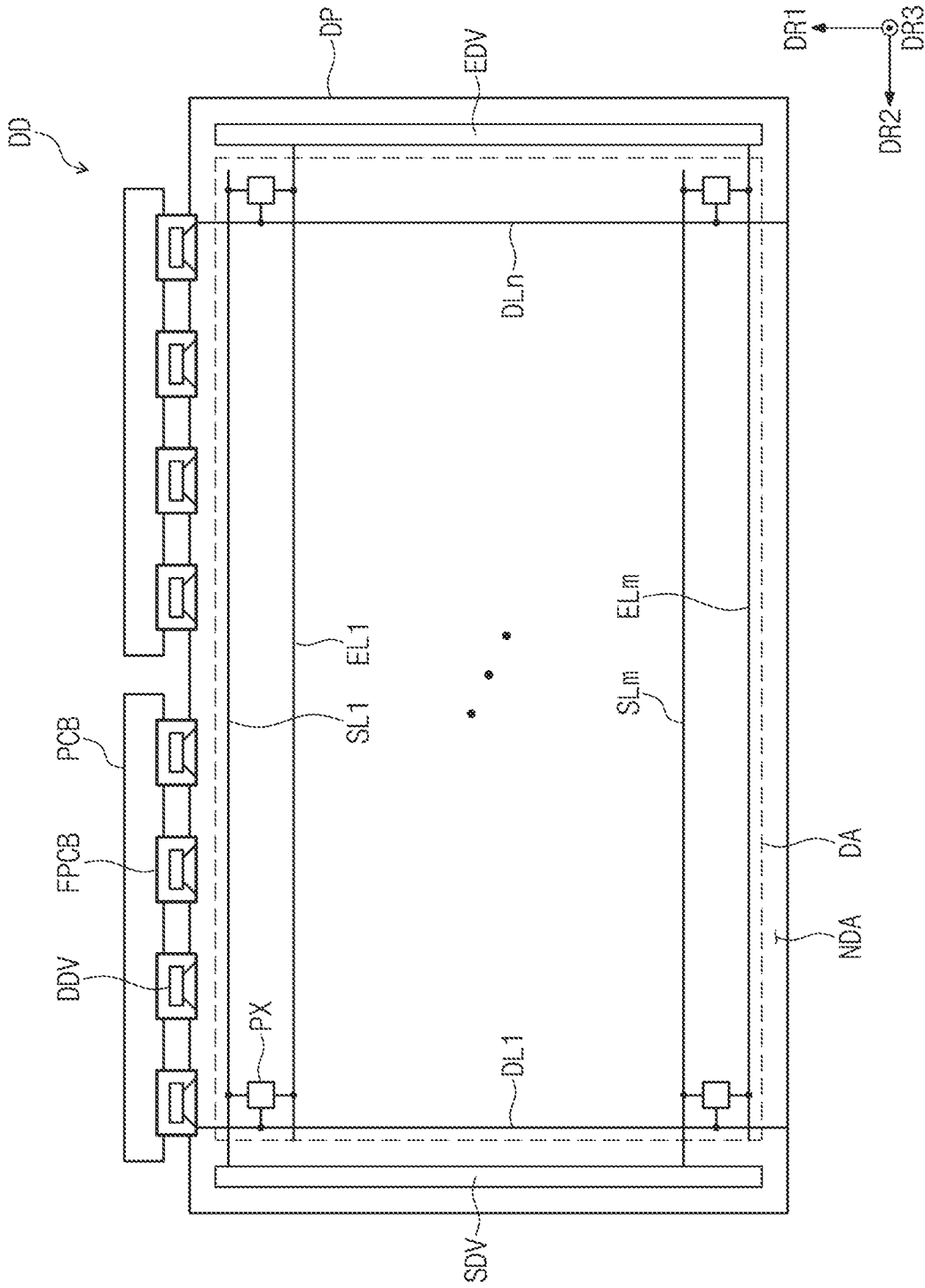
FIG. 8 is a plan view of an embodiment of the display panel illustrated in FIG. 6.

FIG. 8 is a plan view of an embodiment of the display panel DP illustrated in FIG. 6.

Referring to FIG. 8, the display device DD may include the display panel DP, a scan driver SDV, a data driver DDV provided in plural including a plurality of data drivers DDV, a flexible circuit board FPCB provided in plural including a plurality of flexible circuit boards FPCB, a printed circuit board PCB provided in plural including a plurality of printed circuit boards PCB, and an emission driver EDV. As used herein, a reference number may indicate a singular element or a plurality of the element. For example, a reference number labeling a singular form of an element within the drawing figures may be used to reference a plurality of the singular element within the text of specification.

The display panel DP may include a display area DA and a non-display area NDA which is adjacent to the display area DA. The display panel DP may have a rectangular shape with long sides extending in the second direction DR2 and short sides extending in the first direction DR1. However, the shape of the display panel DP is not limited thereto.

The display panel DP may include a plurality of pixels PX, a plurality of scan lines SL1 to SLm, a plurality of data lines DL1 to DLn, and a plurality of emission lines EL1 to ELm. "m" and "n" are natural numbers.

The pixels PX may be disposed in the display area DA. The scan driver SDV and the emission driver EDV may be disposed in the non-display areas NDA adjacent to the short sides of the display panel DP, respectively.

The data drivers DDV may be disposed adjacent to the upper side of the display panel DP that is defined as corresponding to one of the long sides of the display panel DP. The printed circuit boards PCB may be disposed adjacent to the upper side of the display panel DP. The flexible circuit boards FPCB may be connected to the upper side of the display panel DP and the printed circuit boards PCB. The data drivers DDV may be in the form of an integrated circuit chip and may be mounted on the respective flexible circuit boards FPCB.

The scan lines SL1 to SLm may extend in the second direction DR2 and may be connected to the pixels PX and the scan driver SDV. The emission lines EL1 to ELm may extend in the second direction DR2 and may be connected to the pixels PX and the emission driver EDV. The data lines DL1 to DLn may extend in the first direction DR1 and may be connected to the pixels PX and the data drivers DDV.

Although not illustrated, the display device DD may further include a timing controller for controlling operations of the scan driver SDV, the data drivers DDV, and the emission driver EDV. The timing controller may be in the form of an integrated circuit chip and may be mounted on the printed circuit boards PCB. The timing controller may be connected to the data drivers DDV, the scan driver SDV, and the emission driver EDV through the printed circuit boards PCB and the flexible circuit boards FPCB.

The scan driver SDV may generate a plurality of scan signals as electrical signals, and the scan signals may be applied to the pixels PX through the scan lines SL1 to SLm. The data drivers DDV may generate a plurality of data voltages as electrical signals, and the data voltages may be applied to the pixels PX through the data lines DL1 to DLn. The emission driver EDV may generate a plurality of emission signals as electrical signals, and the emission signals may be applied to the pixels PX through the emission lines EL1 to ELm.

The pixels PX may receive the data voltages in response to the scan signals. The pixels PX may display an image by emitting light having luminance corresponding to the data voltages in response to the emission signals. Emission time of the pixels PX may be controlled by the emission signals.

Figure 9:
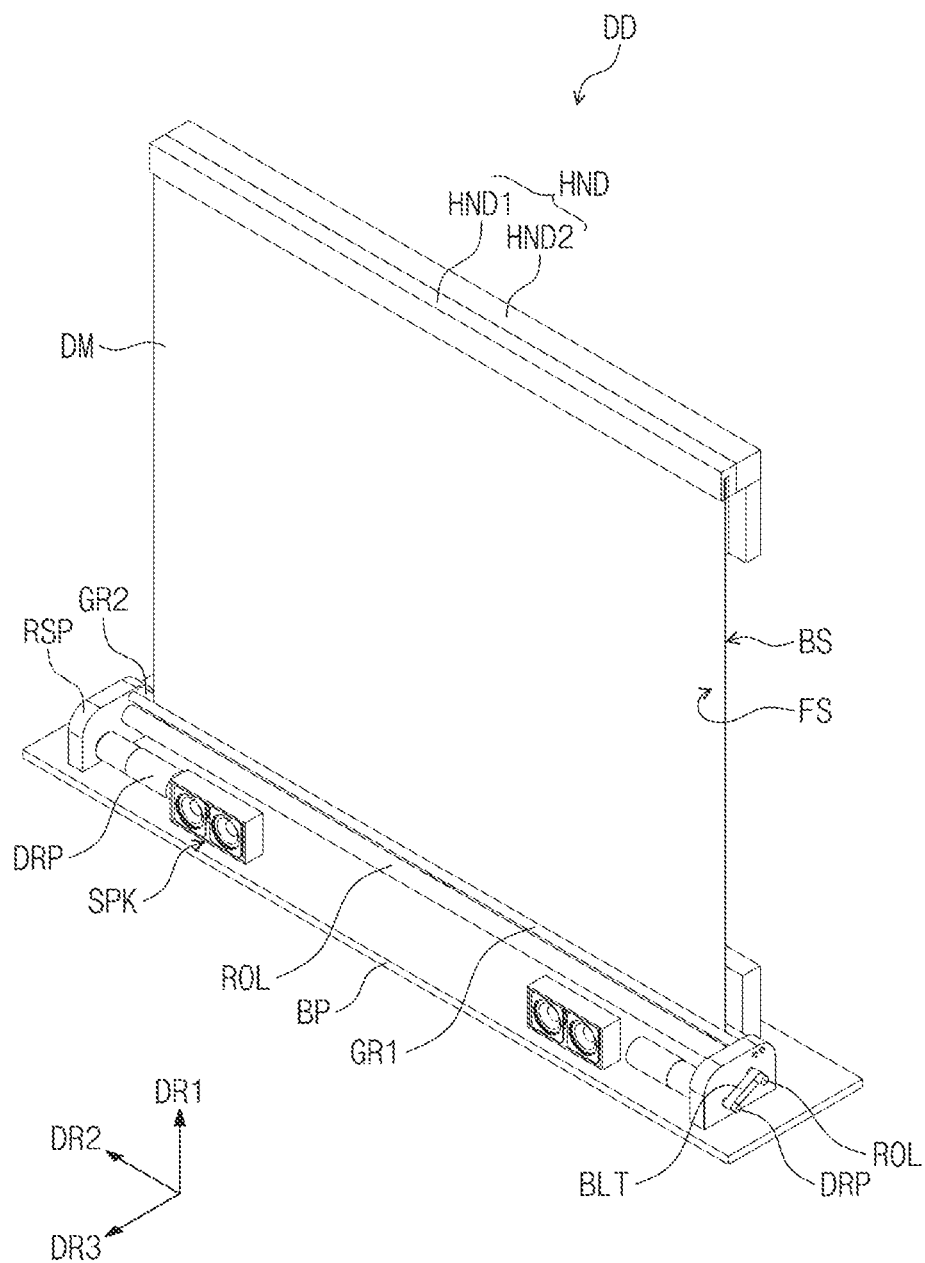
FIG. 9 is a view illustrating an embodiment of the inside of the housing of the display device illustrated in FIG. 5.
Figure 10:
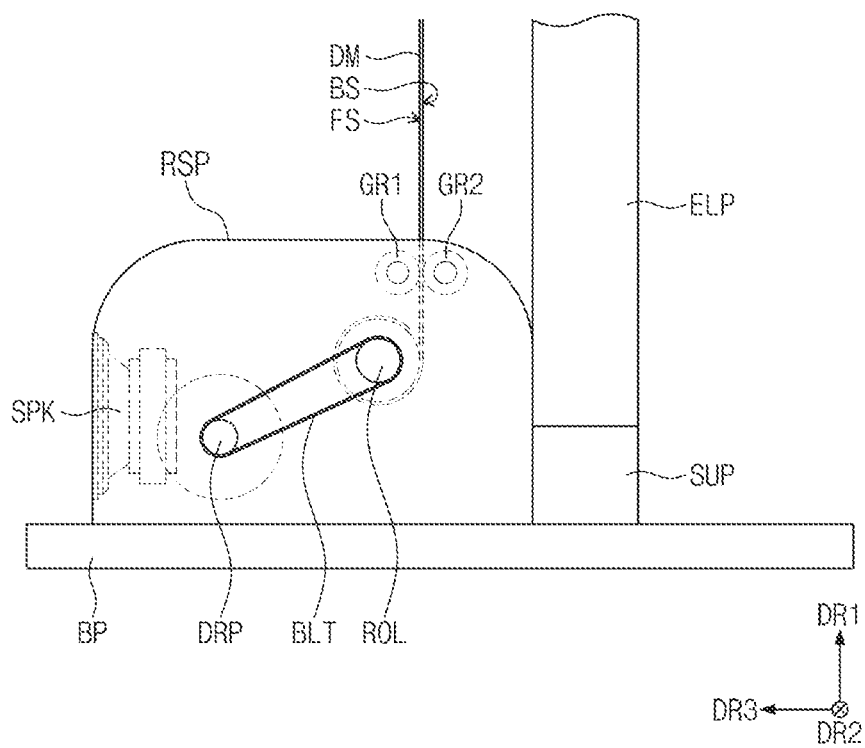
FIG. 10 is a side view of an embodiment of drive parts, a roller, first and second guide rollers, and speakers illustrated in FIG. 9.
Figure 11:
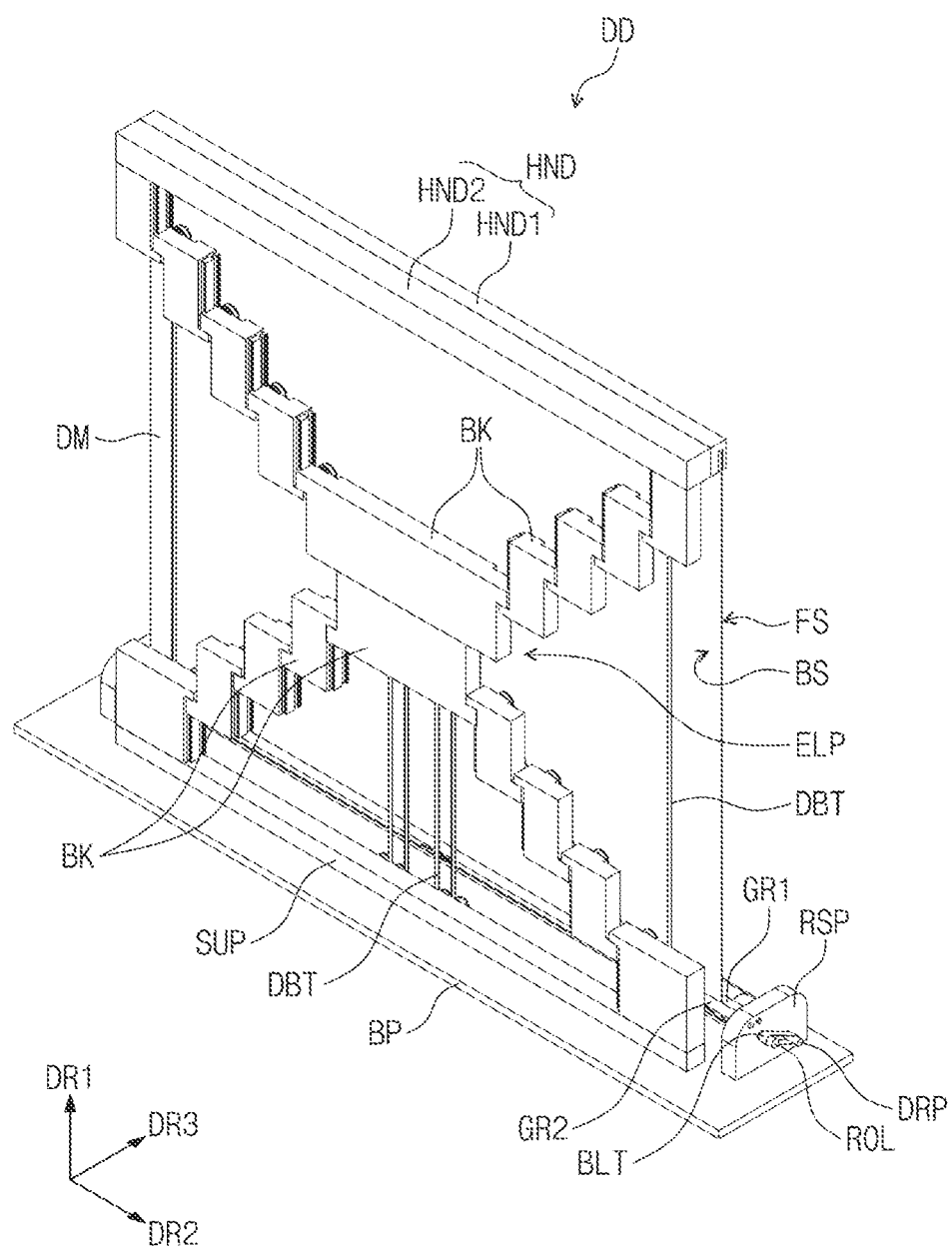
FIG. 11 is a view illustrating an embodiment of a lifting part on a rear surface of the display module illustrated in FIG. 9.

FIG. 9 is a view illustrating an embodiment of a view of inside of the housing HS of the display device DD illustrated in FIG. 5. FIG. 10 is a side view of an embodiment of drive parts DRP, a roller ROL, first and second guide rollers GR1 and GR2, and speakers SPK illustrated in FIG. 9. FIG. 11 is a view illustrating an embodiment of a lifting part disposed on the rear surface BS of the display module DM illustrated in FIG. 9.

In FIGS. 9, 10, and 11, the bottom part BP of the housing HS is illustrated, and the upper part UP and the sidewall parts SP of the housing HS are omitted for convenience of illustration.

Referring to FIGS. 9 and 10, the display device DD may include the plurality of drive parts DRP, the roller ROL, the first and second guide rollers GR1 and GR2, a plurality of roller support parts RSP, belts BLT, and the speakers SPK.

The drive parts DRP, the roller ROL, the first and second guide rollers GR1 and GR2, the roller support parts RSP, the belts BLT, and the speakers SPK may be disposed in the housing HS. The drive parts DRP, the roller ROL, the first and second guide rollers GR1 and GR2, the roller support parts RSP, the belts BLT, and the speakers SPK may be disposed on the bottom part BP of the housing HS.

The drive parts DRP may have a cylindrical shape extending in the second direction DR2. The drive parts DRP may be spaced apart from each other in the second direction DR2 and may face each other in the second direction DR2. The drive parts DRP may include motors. The drive parts DRP may rotate (e.g., be rotatable) about an axis of rotation parallel to the second direction DR2. The drive parts DRP may rotate in the clockwise or counterclockwise direction about the axis of rotation parallel to the second direction DR2.

The roller ROL may have a cylindrical shape extending in the second direction DR2. The roller ROL may rotate about an axis of rotation parallel to the second direction DR2. The roller ROL may rotate in the clockwise or counterclockwise direction about the axis of rotation parallel to the second direction DR2.

The display module DM may have opposite ends opposite to each other in the first direction DR1, and one end (e.g., a lower end closest to the bottom part BP as a first end) of the display module DM may be connected to the roller ROL. The opposite end of the display module DM (e.g., upper end farthest in the first direction DR1 as a second end) may be connected to the upper support part HND. The first direction DR1 may be defined as the direction from the one end of the display module DM toward the opposite end of the display module DM. The display module DM may be wound around, or unwound from, the roller ROL (e.g., windable and unwindable around the roller ROL).

The upper support part HND may include a first upper support part HND1 that extends in the second direction DR2, and a second upper support part HND2 that is disposed adjacent to the first upper support part HND1 in the third direction DR3 and that extends in the second direction DR2.

The opposite end of the display module DM may be connected to the first upper support part HND1. Although not illustrated, the flexible circuit boards FPCB and the printed circuit boards PCB described above may be connected to the opposite end of the display module DM and may be disposed inside the first upper support part HND1. The second upper support part HND2 may be disposed on (or facing) the rear surface BS of the display module DM. The second upper support part HND2 may be connected to the first upper support part HND1.

The drive parts DRP may be spaced apart from the roller ROL in the third direction DR3 and may be disposed closer to the bottom part BP than the roller ROL. The drive parts DRP may be disposed farther away from the display module DM than the roller ROL.

The first and second guide rollers GR1 and GR2 may have a cylindrical shape extending in the second direction DR2. The first and second guide rollers GR1 and GR2 may be disposed in a higher position in the first direction DR1 than the roller ROL. The first and second guide rollers GR1 and GR2 may rotate about axes of rotation parallel to the second direction DR2. The first and second guide rollers GR1 and GR2 may rotate in the clockwise or counterclockwise direction about the axes of rotation parallel to the second direction DR2.

The display module DM rolled on the roller ROL extends from the roller ROL and may pass between the first guide roller GR1 and the second guide roller GR2 to extend in the first direction DR1. The first guide roller GR1 and the second guide roller GR2 may guide a movement of the display module DM along the first direction DR1.

The roller support parts RSP may be spaced apart from each other in the second direction DR2 and may face each other in the second direction DR2. The roller support parts RSP may be disposed outward of opposing sides of the display module DM which are opposite to each other in the second direction DR2. The display module DM may be disposed between the roller support parts RSP, in the housing HS.

The drive parts DRP may be disposed between the roller support parts RSP and may be connected to the roller support parts RSP. Sides of the drive parts DRP may pass through the roller support parts RSP in the second direction DR2 and may protrude toward outside of the roller support parts RSP. The outsides of the roller support parts RSP may be defined as the outer surfaces of the roller support parts RSP that face away from inner surfaces of the roller support parts RSP that face each other.

The roller ROL and the first and second guide rollers GR1 and GR2 may be disposed between the roller support parts RSP and may be connected to the roller support parts RSP. The opposite sides of the roller ROL opposite to each other in the second direction DR2 may pass through the roller support parts RSP and may protrude outside of the roller support parts RSP.

The belts BLT may have a closed loop shape and may connect the drive parts DRP and the roller ROL to each other. The belts BLT may surround the drive parts DRP and the roller ROL in a closed loop shape at the outsides of the roller support parts RSP. The belts BLT may be defined as timing belts that transmit power. The torques of the drive parts DRP may be transmitted to the roller ROL, through the belts BLT.

In a view of the drive parts DRP from an outside thereof, rotation of the drive parts DRP in the clockwise direction transmits the torques of the drive parts DRP to the roller ROL through the belts BLT so that the roller ROL may rotate in the clockwise direction. As the roller ROL rotates in the clockwise direction, the display module DM may be wound around the roller ROL and retracted into the housing HS. That is, the display module DM is movable together with rotation of the drive parts DRP.

Winding of the display module DM around the roller ROL moves the display module DM between the first guide roller GR1 and the second guide roller GR2 along the first direction DR1, while the first guide roller GR1 rotates in the clockwise direction and the second guide roller GR2 rotates in the counterclockwise direction.

In a view of the drive parts DRP from an outside thereof, rotation of the drive parts DRP in the counterclockwise direction transmits the torques of the drive parts DRP to the roller ROL, through the belts BLT, so that the roller ROL may rotate in the counterclockwise direction. As the roller ROL rotates in the counterclockwise direction, the display module DM may be unwound from the roller ROL and extended outside of the housing HS.

Unwinding of the display module DM from the roller ROL moves the display module DM between the first guide roller GR1 and the second guide roller GR2 along the first direction DR1, while the first guide roller GR1 rotates in the counterclockwise direction and the second guide roller GR2 rotates in the clockwise direction.

The speakers SPK may be disposed between the drive parts DRP, in a direction along the bottom part BP. The speakers SPK may be acoustic devices that generate sound.

Referring to FIGS. 10 and 11, the display device DD may include the lifting part ELP disposed on the rear surface BS of the display module DM and a lower support part SUP that is disposed on the bottom part BP and that extends in the second direction DR2.

With respect to the first direction DR1, the second upper support part HND2 may be disposed over the lower support part SUP, and the lifting part ELP may be disposed between the second upper support part HND2 and the lower support part SUP. One end (e.g., lower end) of the lifting part ELP may be connected to the lower support part SUP, and an opposite end of the lifting part ELP (e.g., upper end) may be connected to the second upper support part HND2.

The lifting part ELP may be used to extend the display module DM out of the housing HS or retract the display module DM into the housing HS. The lifting part ELP may be accommodated in the housing HS, that is, at an inner area of the housing HS. The lifting part ELP may be extendable and retractable relative to the housing HS, along the first direction DR1, on the rear surface BS of the display module DM. As the lifting part ELP moves in the first direction DR1, the upper support part HND may move in the first direction DR1. That is, the upper support part HND is movable together with the lifting part ELP.

The upper support part HND may extract the display module DM from the housing HS as the lifting part ELP extends outside of the housing HS. The upper support part HND may retract the display module DM into the housing HS as the lifting part ELP retracts into the housing HS.

The lifting part ELP may include a plurality of blocks BK disposed on the rear surface BS of the display module DM and a plurality of drive belts DBT which are connected to the blocks BK. The blocks BK may be arranged in the second direction DR2 and may be coupled to each other to reciprocate in the first direction DR1. The blocks BK may be moved by operation of the drive belts DBT. The structure of the lifting part ELP will be described below in detail.

The blocks BK may be disposed between the lower support part SUP and the second upper support part HND2. The blocks BK may be connected to the opposite end of the display module DM. In an embodiment, for example, in FIG. 11, the upper leftmost block BK and the upper rightmost block BK may be connected to the second upper support part HND2, and the second upper support part HND2 may be connected to the first upper support part HND1 connected to the opposite end of the display module DM. According to this structure, the blocks BK connected together may be coupled to the opposite end of the display module DM.

The blocks BK may be connected to the lower support part SUP. In an embodiment, for example, in FIG. 11, the lower leftmost block BK and the lower rightmost block BK may be connected to the lower support part SUP. According to this structure, the blocks BK connected together may be coupled to the lower support part SUP.

When the blocks BK move away from each other in the first direction DR1, the display module DM may be extended away from the housing HS. When the blocks BK move toward each other in the first direction DR1, the display module DM may be retracted into the housing HS. That is, the display module DM is movable together with the blocks BK.

Figure 12:
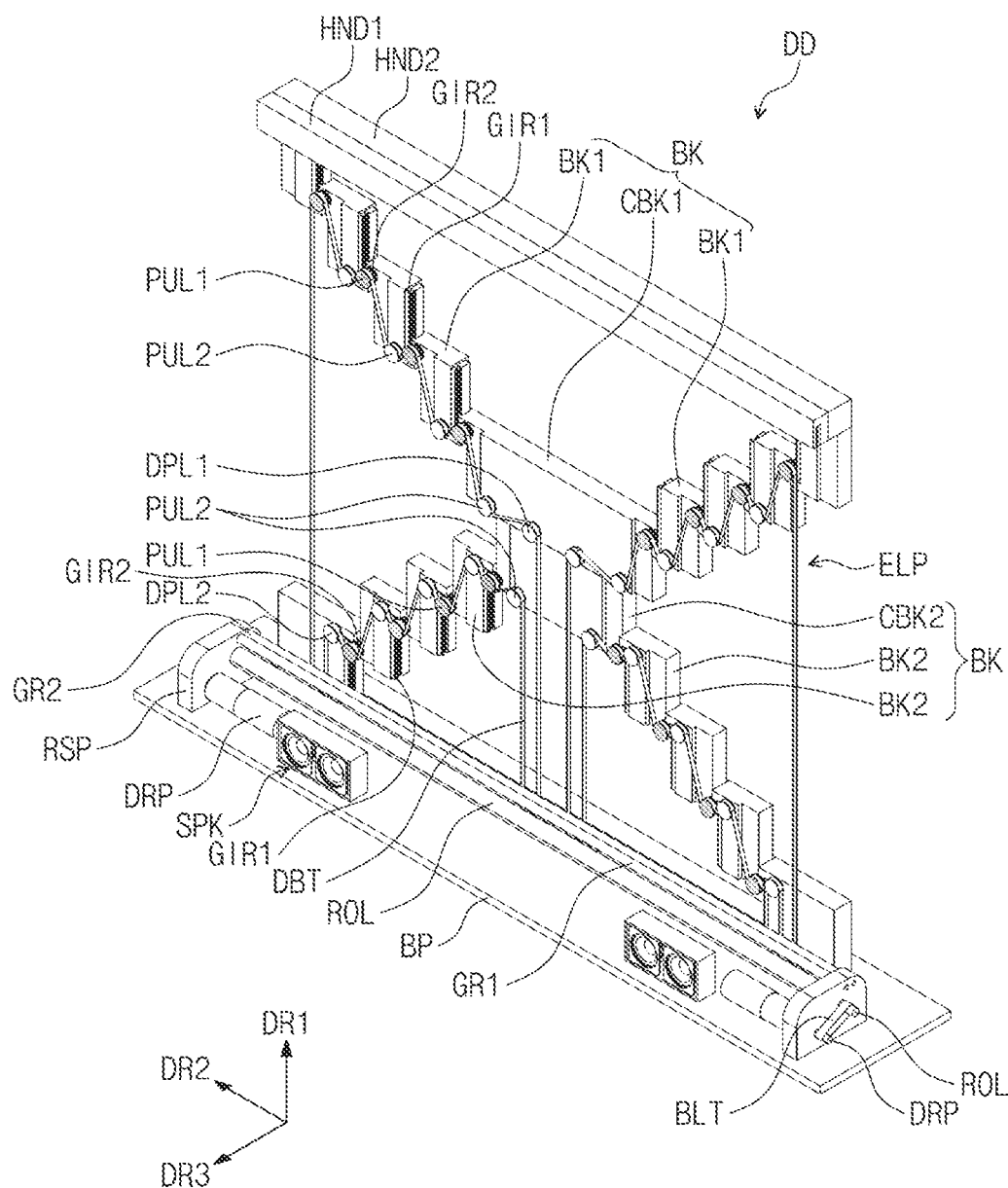
FIGS. 12 and 13 are views illustrating an embodiment of a front side of the lifting part, where the display module in FIG. 9 is omitted.
Figure 13:
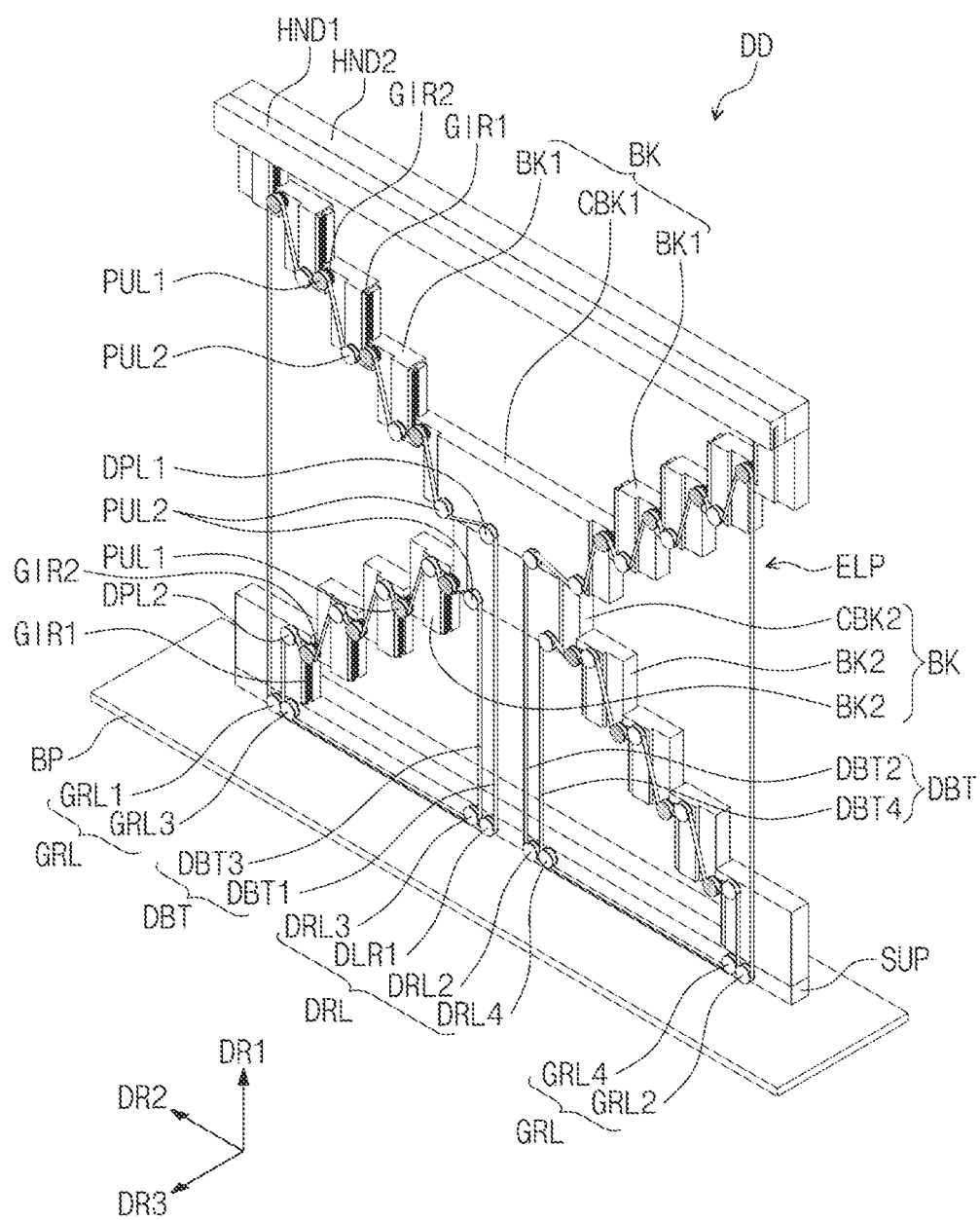
Figure 14:
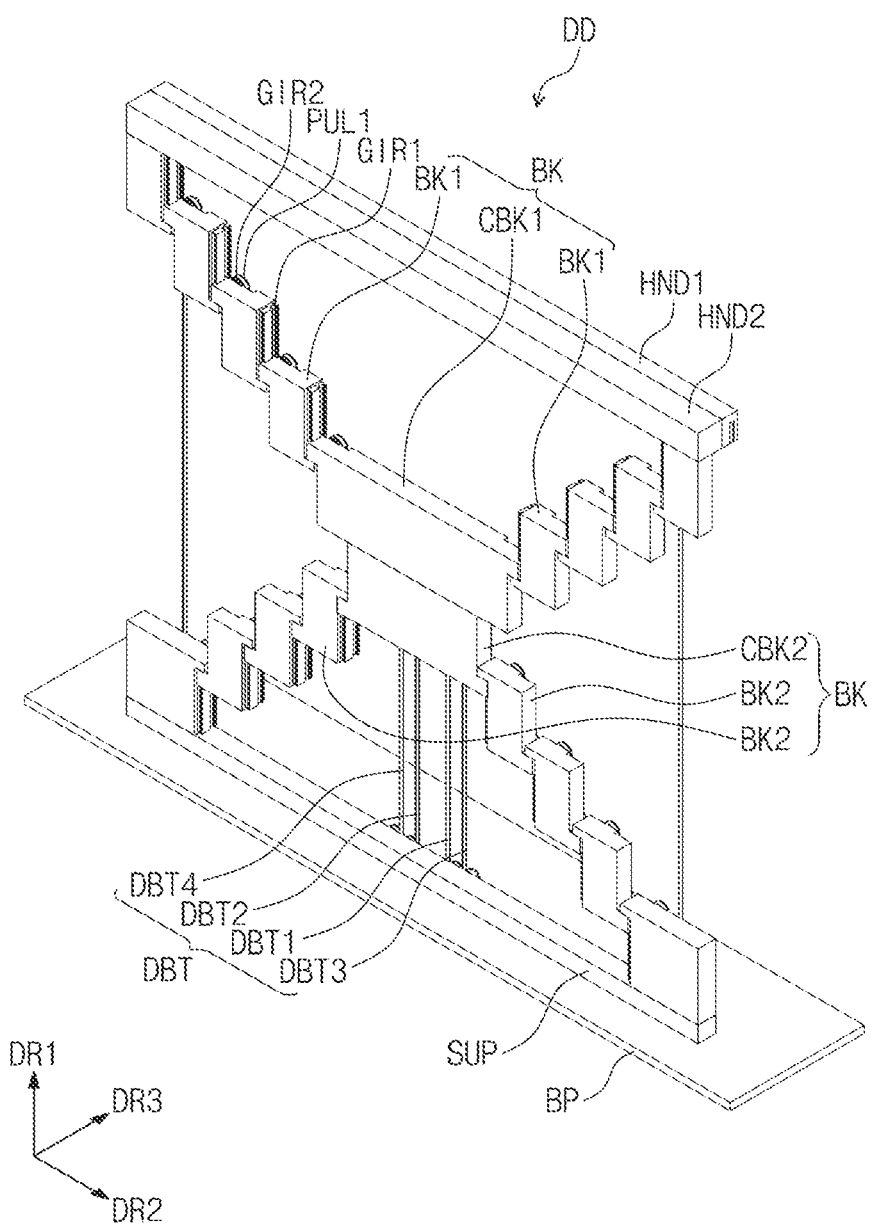
FIG. 14 is a view illustrating an embodiment of a rear side of the lifting part, where the display module in FIG. 11 is omitted.

FIGS. 12 and 13 are views illustrating the front side of the lifting part ELP, where the display module DM in FIG. 9 is omitted for convenience of illustration. FIG. 14 is a view illustrating the rear side of the lifting part ELP, where the display module DM in FIG. 11 is omitted for convenience of illustration.

To more clearly illustrate the configuration of the lifting part ELP, components related to winding and unwinding the display module DM, for example, the drive parts DRP, the roller ROL, the first and second guide rollers GR1 and GR2, the roller support parts RSP, the belts BLT, and the speaker SPK are omitted in FIGS. 13 and 14.

Referring to FIGS. 12 to 14, the lifting part ELP may include the plurality of blocks BK, the plurality of drive belts DBT, a plurality of first and second gears GIR1 and GIR2, a plurality of first and second pulleys PUL1 and PUL2, and a plurality of first and second dummy pulleys DPL1 and DPL2. The blocks BK may include a first center block CBK1, a plurality of first blocks BK1, a second center block CBK2, and a plurality of second blocks BK2.

The terms "over" and "under" used herein may define relative positions of components with respect to the first direction DR1.

The blocks BK may be disposed over the lower support part SUP. The second blocks BK2 and the second center block CBK2 may be disposed over the lower support part SUP. The first center block CBK1 may be disposed over the second center block CBK2. The second center block CBK2 may be connected to the first center block CBK1 in contact with the first center block CBK1. The first blocks BK1 may be disposed over the second blocks BK2. The first and second upper support parts HND1 and HND2 may be disposed over the first blocks BK1 and the first center block CBK1. That is, the display module DM which is extended out of the housing HS may dispose on the second blocks BK2, the second center block CBK2, the first center block CBK1, the first blocks BK1 and the upper support part HND in order along the first direction from the lower support part SUP.

The first blocks BK1 and the first center block CBK1 may be arranged in the second direction DR2 and may be coupled together to reciprocate in the first direction DR1. The second blocks BK2 and the second center block CBK2 may be arranged in the second direction DR2 and may be coupled together to reciprocate in the first direction DR1. That is, the blocks BK may be movable together with each other in the first direction DR1.

FIGS. 12 to 14 illustrate the first center block CBK1 and the first blocks BK1 which are moved in the first direction DR1 to extend the display module DM out of the housing HS in the first direction DR1. Furthermore, the second center block CBK2 and the second blocks BK2 are illustrated as being moved in the first direction DR1 to extend the display module DM out of the housing HS. Depending on the movement state (a degree of extension of the display module DM or a distance at which the display module DM is extended out of the housing HS), the blocks BK may be arranged in the shape of "X".

Figure 33:
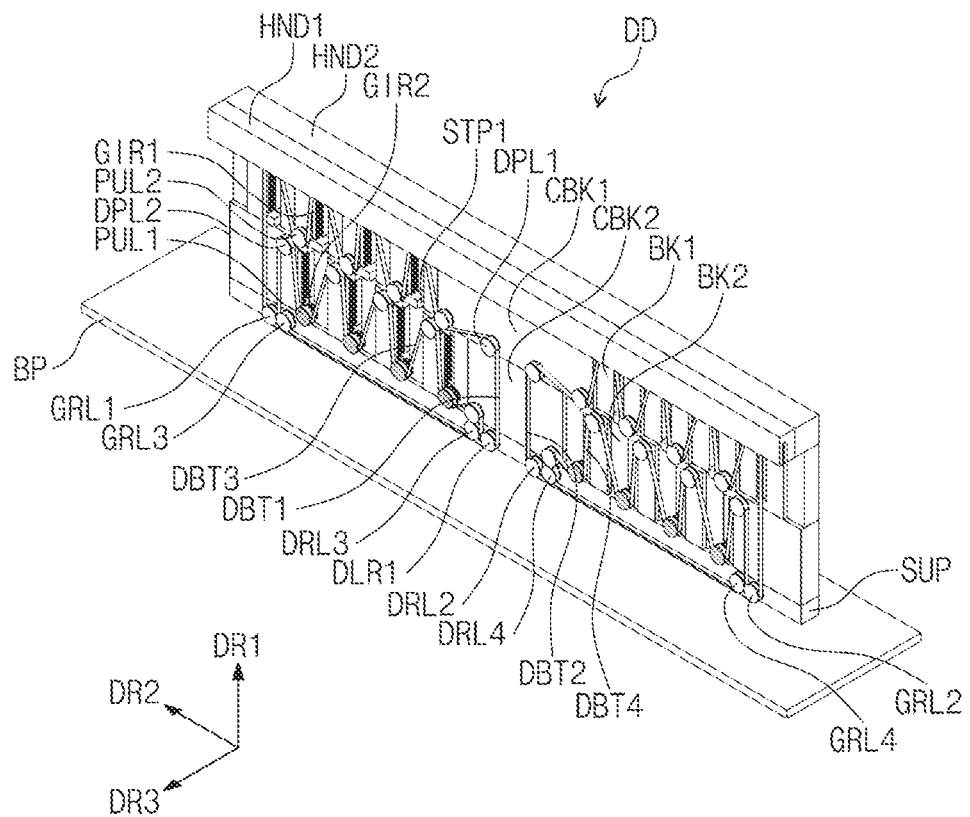
Figure 34:
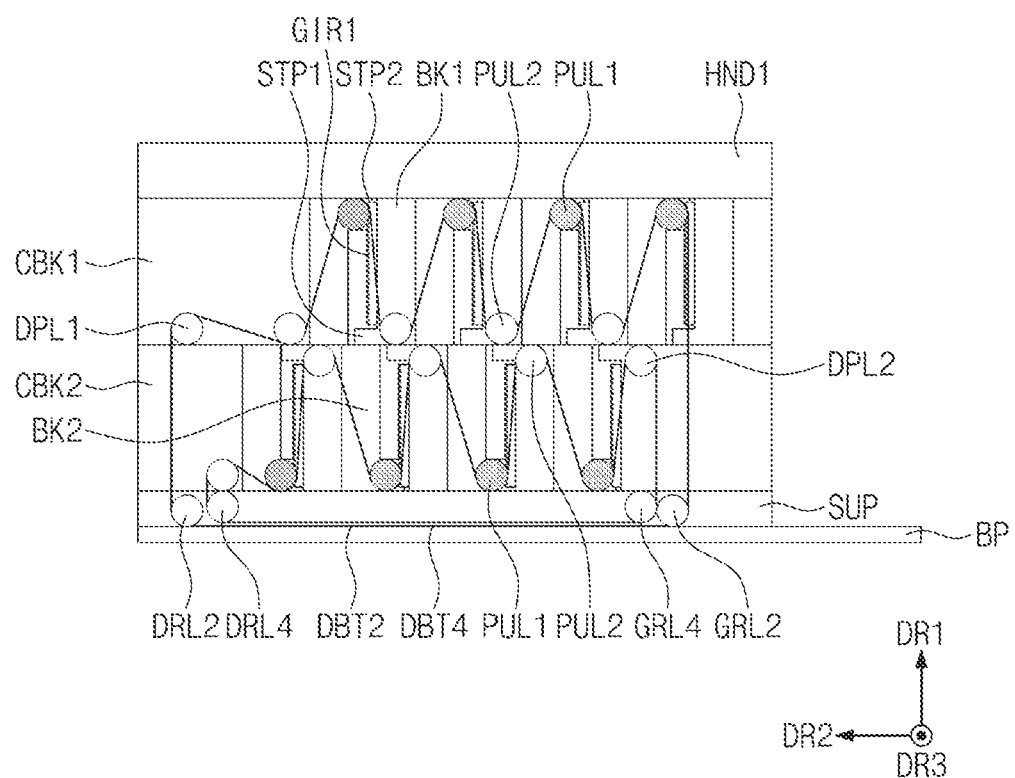
FIG. 34 is a front view illustrating an embodiment of first right blocks, a first right center-block, second right blocks and a second right center-block illustrated in FIG. 33.

However, when the display module DM is disposed in the housing HS, the first center block CBK1 and the first blocks BK1 may be disposed in the housing HS and may be arranged in the second direction DR2. Furthermore, when the display module DM is disposed in the housing HS, the second center block CBK2 and the second blocks BK2 may be in the housing HS and may be arranged in the second direction DR2. The arrangement state is illustrated in FIGS. 33 and 34. That is, the display module DM which is in the housing HS may dispose the first center block CBK1 and the first blocks BK1 (and the second center block CBK2 and the second blocks BK2) aligned or coplanar with each other.

The first blocks BK1 may be disposed on the opposite sides of the first center block CBK1 opposite to each other in the second direction DR2. The first blocks BK1 may be coupled to the opposite sides of the first center block CBK1 and may be arranged in the second direction DR2. The second blocks BK2 may be disposed on the opposite sides of the second center block CBK2 opposite to each other in the second direction DR2. The second blocks BK2 may be coupled to the opposite sides of the second center block CBK2 and may be arranged in the second direction DR2.

The leftmost and rightmost first blocks BK1 in the second direction DR2 may be disposed under the second upper support part HND2 and may be connected to the second upper support part HND2. The leftmost and rightmost second blocks BK2 in the second direction DR2 may be disposed over the lower support part SUP and may be connected to the lower support part SUP.

The first and second gears GIR1 and GIR2, the first and second pulleys PUL1 and PUL2, and the first and second dummy pulleys DPL1 and DPL2 may be respectively coupled to the blocks BK. The first and second pulleys PUL1 and PUL2 and the first and second dummy pulleys DPL1 and DPL2 may have a circular shape when viewed in the third direction DR3.

The drive belts DBT may be coupled to the first and second pulleys PUL1 and PUL2 and the first and second dummy pulleys DPL1 and DPL2 and may rotate the first and second pulleys PUL1 and PUL2 and the first and second dummy pulleys DPL1 and DPL2. The first and second pulleys PUL1 and PUL2 and the first and second dummy pulleys DPL1 and DPL2 may rotate about axes of rotation parallel to the third direction DR3.

The blocks BK may be coupled by the first and second gears GIR1 and GIR2, the first and second pulleys PUL1 and PUL2, the first and second dummy pulleys DPL1 and DPL2, and the drive belts DBT to reciprocate in the first direction DR1. This structure will be described below in detail with reference to detailed drawings.

A pair of first and second gears GIR1 and GIR2 may be connected to each of the first blocks BK1 other than the leftmost and rightmost first blocks BK1. A first gear GIR1 may be connected to each of the leftmost and rightmost first blocks BK1. Second gears GIR2 may be connected to the opposite sides of the first center block CBK1 opposite to each other in the second direction DR2.

A pair of first and second pulleys PUL1 and PUL2 may be connected to each of the first blocks BK1 other than the leftmost and rightmost first blocks BK1. A pair of first and second pulleys PUL1 and PUL2 may be connected to the first center block CBK1 so as to be adjacent to one side of the first center block CBK1 in the second direction DR2, and a pair of first and second pulleys PUL1 and PUL2 may be connected to the first center block CBK1 so as to be adjacent to an opposite side of the first center block CBK1 in the second direction DR2.

The pair of first and second pulleys PUL1 and PUL2 connected to each of the first blocks BK1 may be spaced apart from each other in the second direction DR2 and may be adjacent to upper and lower ends of the first block BK1, respectively. The pair of first and second pulleys PUL1 and PUL2 connected to the first center block CBK1 so as to be adjacent to the one side of the first center block CBK1 may be spaced apart from each other in the second direction DR2 and may be adjacent to upper end lower ends of a portion of the first center block CBK1 that is adjacent to the one side of the first center block CBK1. The pair of first and second pulleys PUL1 and PUL2 connected to the first center block CBK1 so as to be adjacent to the opposite side of the first center block CBK1 may be spaced apart from each other in the second direction DR2 and may be adjacent to upper end lower ends of a portion of the first center block CBK1 that is adjacent to the opposite side of the first center block CBK1.

Hereinafter, based on FIGS. 12 and 13, the first blocks BK1 coupled to the one side of the first center block CBK1 are defined as the first left blocks BK1, and the first blocks BK1 coupled to the opposite side of the first center block CBK1 are defined as the first right blocks BK1. The second blocks BK2 coupled to the one side of the second center block CBK2 are defined as the second left blocks BK2, and the second blocks BK2 coupled to the opposite side of the second center block CBK2 are defined as the second right blocks BK2.

Furthermore, the left and right sides of the first center block CBK1 with respect to the center of the first center block CBK1 are defined as the first left center-block CBK1 and the first right center-block CBK1. The left and right sides of the second center block CBK2 with respect to the center of the second center block CBK2 are defined as the second left center-block CBK2 and the second right center-block CBK2. The left and right sides of the first center block CBK1 may be distinguished from each other with respect to the second direction DR2, and the left and right sides of the second center block CBK2 may be distinguished from each other with respect to the second direction DR2.

The first dummy pulleys DPL1 may be arranged in the second direction DR2 and may be disposed on the first center block CBK1. The first dummy pulleys DPL1 may be adjacent to the center of the first center block CBK1 and the lower end thereof. One first dummy pulley DPL1 may be disposed on each of the first left center-block CBK1 and the first right center-block CBK1. The first dummy pulleys DPL1 may be closer to the center of the first center block CBK1 than the first and second pulleys PUL1 and PUL2 connected to the first center block CBK1.

The first left blocks BK1 may be symmetric to the first right blocks BK1. The first left center-block CBK1 may be symmetric to the first right center-block CBK1. Such symmetry may be relative a center of the lifting part ELP along the second direction DR2.

The first and second pulleys PUL1 and PUL2, the first and second gears GIR1 and GIR2, and the first dummy pulley DPL1 that are connected to the first left blocks BK1 and the first left center-block CBK1 may be symmetric to the first and second pulleys PUL1 and PUL2, the first and second gears GIR1 and GIR2, and the first dummy pulley DPL1 that are connected to the first right blocks BK1 and the first right center-block CBK1.

A pair of first and second gears GIR1 and GIR2 may be connected to each of the second blocks BK2 other than the leftmost and rightmost second blocks BK2. A first gear GIR1 may be connected to each of the leftmost and rightmost second blocks BK2. Second gears GIR2 may be connected to the opposite sides of the second center block CBK2 opposite to each other in the second direction DR2.

A pair of first and second pulleys PUL1 and PUL2 may be connected to each of the second blocks BK2 other than the leftmost and rightmost second blocks BK2. A pair of first and second pulleys PUL1 and PUL2 may be connected to the second center block CBK2 so as to be adjacent to the one side of the second center block CBK2 in the second direction DR2, and a pair of first and second pulleys PUL1 and PUL2 may be connected to the second center block CBK2 so as to be adjacent to the opposite side of the second center block CBK2 in the second direction DR2.

The pair of first and second pulleys PUL1 and PUL2 connected to each of the second blocks BK2 may be spaced apart from each other in the second direction DR2 and may be adjacent to upper and lower ends of the second block BK2, respectively. The pair of first and second pulleys PUL1 and PUL2 connected to the second center block CBK2 so as to be adjacent to the one side of the second center block CBK2 may be spaced apart from each other in the second direction DR2 and may be adjacent to a lower end of a portion of the second center block CBK2 that is adjacent to the one side of the second center block CBK2. The pair of first and second pulleys PUL1 and PUL2 connected to the second center block CBK2 so as to be adjacent to the opposite side of the second center block CBK2 may be spaced apart from each other in the second direction DR2 and may be adjacent to a lower end of a portion of the second center block CBK2 that is adjacent to the opposite side of the second center block CBK2.

One second dummy pulley DPL2 may be connected to each of the leftmost second block BK2 and the rightmost second block BK2. The second dummy pulleys DPL2 may be adjacent to upper ends of the leftmost and rightmost second blocks BK2, respectively.

The second left blocks BK2 may be symmetric to the second right blocks BK2. The second left center-block CBK2 may be symmetric to the second right center-block CBK2.

The first and second pulleys PUL1 and PUL2, the first and second gears GIR1 and GIR2, and the second dummy pulley DPL2 that are connected to the second left blocks BK2 and the second left center-block CBK2 may be symmetric to the first and second pulleys PUL1 and PUL2, the first and second gears GIR1 and GIR2, and the second dummy pulley DPL2 that are connected to the second right blocks BK2 and the second right center-block CBK2.

The second center block CBK2 may be substantially symmetric to the first center block CBK1. The second blocks BK2 may be substantially symmetric to the first blocks BK1.

Except for the difference in the positions of the second pulleys PUL2, the first and second pulleys PUL1 and PUL2 and the second gears GIR2 that are connected to the first center block CBK1 may be substantially symmetric to the first and second pulleys PUL1 and PUL2 and the second gears GIR2 that are connected to the second center block CBK2. Unlike the second center block CBK2, the first center block CBK1 may further include the first dummy pulleys DPL1 disposed thereon.

The first and second pulleys PUL1 and PUL2 and the first and second dummy pulleys DPL1 and DPL2 may be disposed on the front surfaces of the blocks BK that each face the display module DM.

The first and second pulleys PUL1 and PUL2 and the first and second gears GIR1 and GIR2 that are connected to the first blocks BK1 may be substantially symmetric to the first and second pulleys PUL1 and PUL2 and the first and second gears GIR1 and GIR2 that are connected to the second blocks BK2. Unlike the first blocks BK1, the leftmost and rightmost second blocks BK2 may further include the second dummy pulleys DPL2 disposed thereon.

The blocks BK have substantially the same structure, and therefore the structures of some of the first blocks BK1, the first and second gears GIR1 and GIR2 connected to the some of the first blocks BK1, and the first and second pulleys PUL1 and PUL2 connected to the some of the first blocks BK1 will hereinafter be described in detail.

Drive rollers DRL and guide rollers GRL may be disposed under the blocks BK. The drive rollers DRL and the guide rollers GRL may be arranged in the second direction DR2 and may be connected to the lower support part SUP. The drive rollers DRL and the guide rollers GRL may be disposed on the front surface of the lower support part SUP that faces the display module DM and may be connected to the lower support part SUP. The guide rollers GRL may be spaced apart from the drive rollers DRL in the second direction DR2.

With respect to the second direction DR2, the drive rollers DRL may be adjacent to the central portion of the lower support part SUP, and the guide rollers GRL may be adjacent to the opposite sides of the lower support part SUP. The drive rollers DRL and the guide rollers GRL may have a circular shape when viewed in the third direction DR3.

The drive belts DBT may have a closed loop shape and may be connected to the drive rollers DRL, the guide rollers GRL, the first and second pulleys PUL1 and PUL2, and the first and second dummy pulleys DPL1 and DPL2. The drive belts DBT may extend along the drive rollers DRL, the guide rollers GRL, the first and second pulleys PUL1 and PUL2, and the first and second dummy pulleys DPL1 and DPL2.

The drive belts DBT may move along the drive rollers DRL, the guide rollers GRL, the first and second pulleys PUL1 and PUL2, and the first and second dummy pulleys DPL1 and DPL2. The drive rollers DRL and the guide rollers GRL may rotate about axes of rotation parallel to the third direction DR3. The drive belts DBT may be implemented with timing belts or chain belts.

The drive rollers DRL may include first, second, third, and fourth drive rollers DRL1, DRL2, DRL3, and DRL4 arranged in the second direction DR2. The first and second drive rollers DRL1 and DRL2 may be disposed between the third and fourth drive rollers DRL3 and DRL4. The first drive roller DRL1 may be disposed between the second and third drive rollers DRL2 and DRL3. The second drive roller DRL2 may be disposed between the first and fourth drive rollers DRL1 and DRL4.

The guide rollers GRL may include first, second, third, and fourth guide rollers GRL1, GRL2, GRL3, and GRL4. The first and third guide rollers GRL1 and GRL3 may be adjacent to one side of the lower support part SUP of the opposite sides of the lower support part SUP opposite to each other in the second direction DR2. The first guide roller GRL1 may be more adjacent to (e.g., closer to) the one side of the lower support part SUP than the third guide roller GRL3.

The second and fourth guide rollers GRL2 and GRL4 may be adjacent to an opposite side of the lower support part SUP in the second direction DR2. The second guide roller GRL2 may be more adjacent to the opposite side of the lower support part SUP than the fourth guide roller GRL4. The first and third guide rollers GRL1 and GRL3 may be disposed under the second left blocks BK2, and the second and fourth guide rollers GRL2 and GRL4 may be disposed under the second right blocks BK2.

The drive belts DBT may include first, second, third, and fourth drive belts DBT1, DBT2, DBT3, and DBT4, each of which has a closed loop shape. The first drive belt DBT1 may extend along the first drive roller DRL1, the first guide roller GRL1, the first and second pulleys PUL1 and PUL2 connected to the first left blocks BK1 and the first left center-block CBK1, and the first dummy pulley DPL1 connected to the first left center-block CBK1.

The second drive belt DBT2 may extend along the second drive roller DRL2, the second guide roller GRL2, the first and second pulleys PUL1 and PUL2 connected to the first right blocks BK1 and the first right center-block CBK1, and the first dummy pulley DPL1 connected to the first right center-block CBK1.

The first and second drive rollers DRL1 and DRL2 may be rotated by motors disposed in the lower support part SUP. The first and second drive belts DBT1 and DBT2 may be moved by the rotation of the first and second drive rollers DRL1 and DRL2.

The torques of the first and second drive rollers DRL1 and DRL2 may be transmitted to the first and second guide rollers GRL1 and GRL2, the first and second pulleys PUL1 and PUL2, and the first dummy pulleys DPL1 by the first and second drive belts DBT1 and DBT2. The first and second drive belts DBT1 and DBT2 may be moved by the first and second drive rollers DRL1 and DRL2 to rotate the first and second guide rollers GRL1 and GRL2, the first and second pulleys PUL1 and PUL2, and the first dummy pulleys DPL1.

The third drive belt DBT3 may extend along the third drive roller DRL3, the third guide roller GRL3, the first and second pulleys PUL1 and PUL2 connected to the second left blocks BK2 and the second left center-block CBK2, and the second dummy pulley DPL2 connected to the leftmost second block BK2.

The fourth drive belt DBT4 may extend along the fourth drive roller DRL4, the fourth guide roller GRL4, the first and second pulleys PUL1 and PUL2 connected to the second right blocks BK2 and the second right center-block CBK2, and the second dummy pulley DPL2 connected to the rightmost second block BK2.

The third and fourth drive rollers DRL3 and DRL4 may be rotated by motors disposed in the lower support part SUP.

The third and fourth drive belts DBT3 and DBT4 may be moved by the rotation of the third and fourth drive rollers DRL3 and DRL4.

The torques of the third and fourth drive rollers DRL3 and DRL4 may be transmitted to the third and fourth guide rollers GRL3 and GRL4, the first and second pulleys PUL1 and PUL2, and the second dummy pulleys DPL2 by the third and fourth drive belts DBT3 and DBT4. The third and fourth drive belts DBT3 and DBT4 may be moved by the third and fourth drive rollers DRL3 and DRL4 to rotate the third and fourth guide rollers GRL3 and GRL4, the first and second pulleys PUL1 and PUL2, and the second dummy pulleys DPL2.

The third drive belt DBT3 may be disposed inward of the closed loop shape of the first drive belt DBT1. The fourth drive belt DBT4 may be disposed inward of the closed loop shape of the second drive belt DBT2.

Figure 15:
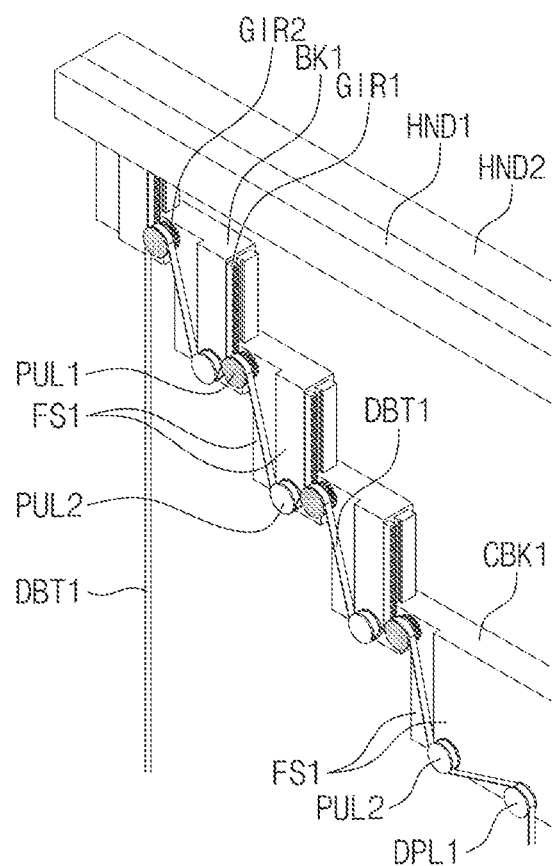
FIG. 15 is an enlarged front perspective view illustrating an embodiment of first blocks and a portion of a first center block illustrated in FIG. 13.
Figure 16:
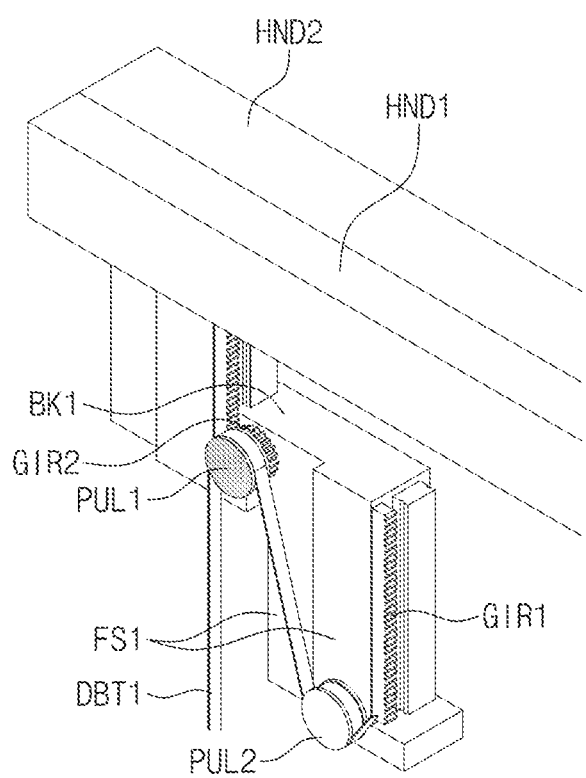
FIG. 16 is an enlarged front perspective view illustrating an embodiment of a part of the first blocks illustrated in FIG. 15.
Figure 16:
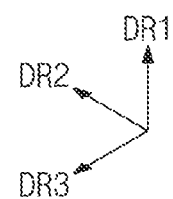
Figure 17:
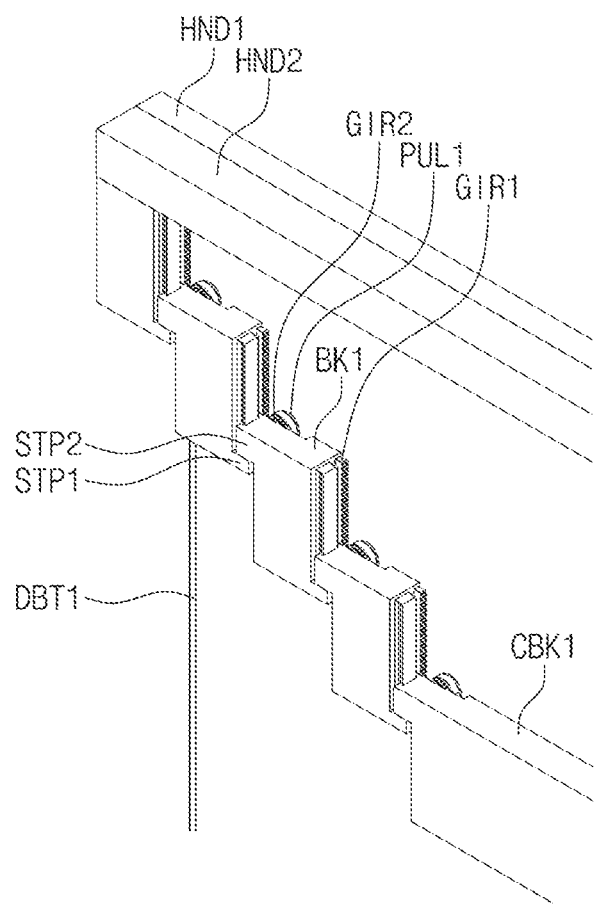
FIG. 17 is an enlarged rear perspective view of an embodiment of the first blocks and the portion of the first center block illustrated in FIG. 15.
Figure 18:
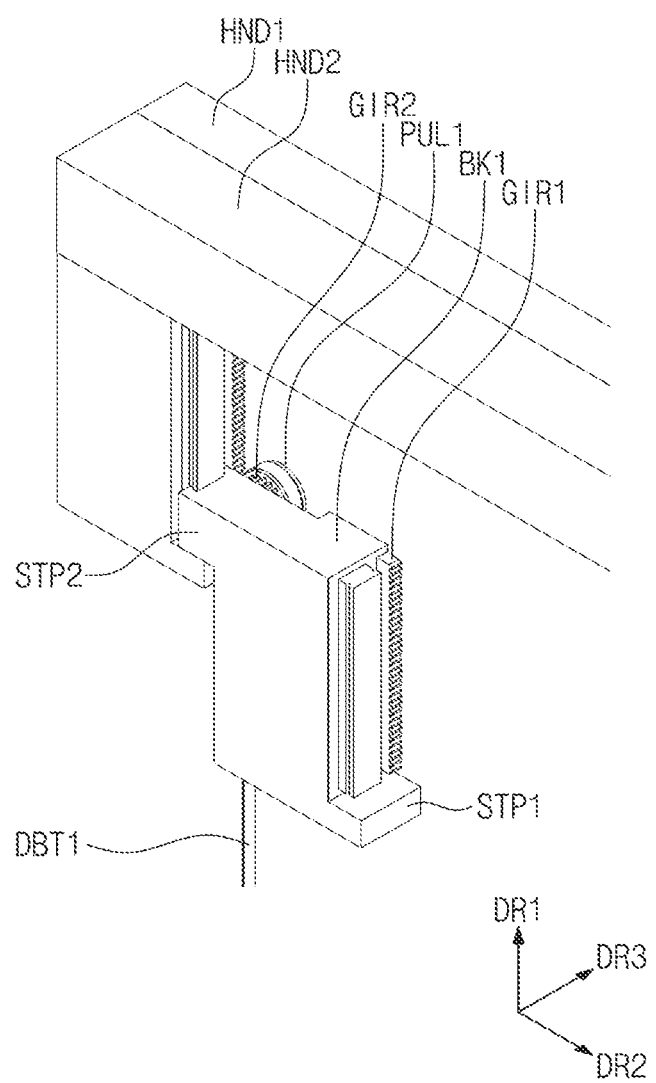
FIG. 18 is an enlarged rear perspective view of an embodiment of the first blocks illustrated in FIG. 16.

FIG. 15 is an enlarged front perspective view illustrating an embodiment of the first blocks BK1 and a portion of the first center block CBK1 illustrated in FIG. 13. FIG. 16 is an enlarged front perspective view illustrating an embodiment of the first blocks BK1 illustrated in FIG. 15. FIG. 17 is an enlarged rear perspective view of an embodiment of the first blocks BK1 and the portion of the first center block CBK1 illustrated in FIG. 15. FIG. 18 is an enlarged rear perspective view of an embodiment of the first blocks BK1 illustrated in FIG. 16.

Referring to FIGS. 15 and 16, the first and second gears GIR1 and GIR2, the first and second pulleys PUL1 and PUL2, and the first dummy pulley DPL1 may be connected to the first blocks BK1 and the first center block CBK1. Each of the first gears GIR1 may be disposed on one side of the opposite sides of each of the first blocks BK1 opposite to each other in the second direction DR2. Each of the first gears GIRT may be disposed facing in a direction toward the first center block CBK1, with respect to the second direction DR2.

Each of the second gears GIR2 may be disposed on a front surface FS1 of a corresponding one of the first blocks BK1 except the leftmost first block BK1, so as to be adjacent to an opposite side of the corresponding first block in the second direction DR2. Each of the second gears GIR2 may extend from the front surface FS1, in a direction toward the display module DM. The second gears GIR2 may be adjacent to the upper ends of the corresponding first blocks BK1, respectively.

In FIGS. 15 and 16, the one side and the opposite side of each of the first blocks BK1 may be defined as the right side and the left side of the first block BK1 along the second direction DR2.

The first and second pulleys PUL1 and PUL2 may be disposed on the front surfaces FS1 of the first blocks BK1 and the front surface FS1 of the first center block CBK1. Each of the first and second pulleys PUL1 and PUL2 may extend from the front surfaces FS1, in a direction toward the display module DM. Each of the first pulleys PUL1 may be adjacent to the opposite side and the upper end of a corresponding one of the first blocks BK1 except the leftmost first block BK1, and each of the second pulleys PUL2 may be adjacent to the one side and the lower end of a corresponding one of the first blocks BK1 except the leftmost first block BK1. When viewed in the third direction DR3, the first pulleys PUL1 may overlap (or correspond to) the second gears GIR2, respectively.

The first pulley PUL1 connected to the first left center-block CBK1 may be adjacent to the one side and the upper end of the first left center-block CBK1, and the second pulley PUL2 connected to the first left center-block CBK1 may be spaced apart from the first pulley PUL1 in the second direction DR2 and may be adjacent to the lower end of the first left center-block CBK1. The first dummy pulley DPL1 connected to the first left center-block CBK1 may be spaced apart from the second pulley PUL2 in the second direction DR2 and may be adjacent to the lower end of the first left center-block CBK1.

The first drive belt DBT1 may be coupled to the first pulleys PUL1 and the second pulleys PUL2 such that the first pulleys PUL1 and the second pulleys PUL2 rotate in opposite directions. The first drive belt DBT1 may be coupled to the first dummy pulley DPL1 and the second pulley PUL2 adjacent to each other such that the first dummy pulley DPL1 and the second pulley PUL2 adjacent to each other rotate in opposite directions.

Likewise to the first drive belt DBT1, the second drive belt DBT2 illustrated in FIG. 13 may be coupled to the first dummy pulley DPL1 and the second pulley PUL2 adjacent to each other such that the first dummy pulley DPL1 and the second pulley PUL2 adjacent to each other rotate in opposite directions. Furthermore, the third drive belt DBT3 (or, the fourth drive belt DBT4) illustrated in FIG. 13 may be coupled to the first pulley PUL1 and the second dummy pulley DPL2 adjacent to each other such that the first pulley PUL1 and the second dummy pulley DPL2 adjacent to each other rotate in opposite directions.

Referring to FIGS. 17 and 18, when the first blocks BK1 and the first center block CBK1 move in the first direction DR1, the travel distances of the first blocks BK1 and the first center block CBK1 in the first direction DR1 may be limited. In an embodiment, for example, the first blocks BK1 and the first center block CBK1 may include stoppers STP1 and STP2 that limit the travel distances of the first blocks BK1 and the first center block CBK1 in the first direction DR1. The structures of the stoppers STP1 and STP2 will be described below in detail.

Figure 19:
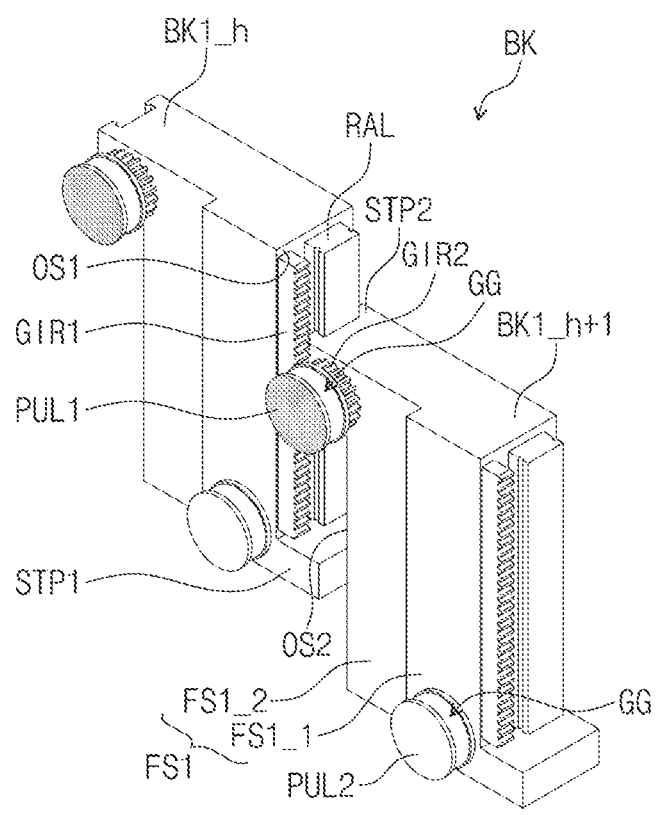
FIG. 19 is an enlarged view illustrating an embodiment of two first blocks among the first blocks illustrated in FIG. 15.
Figure 20:
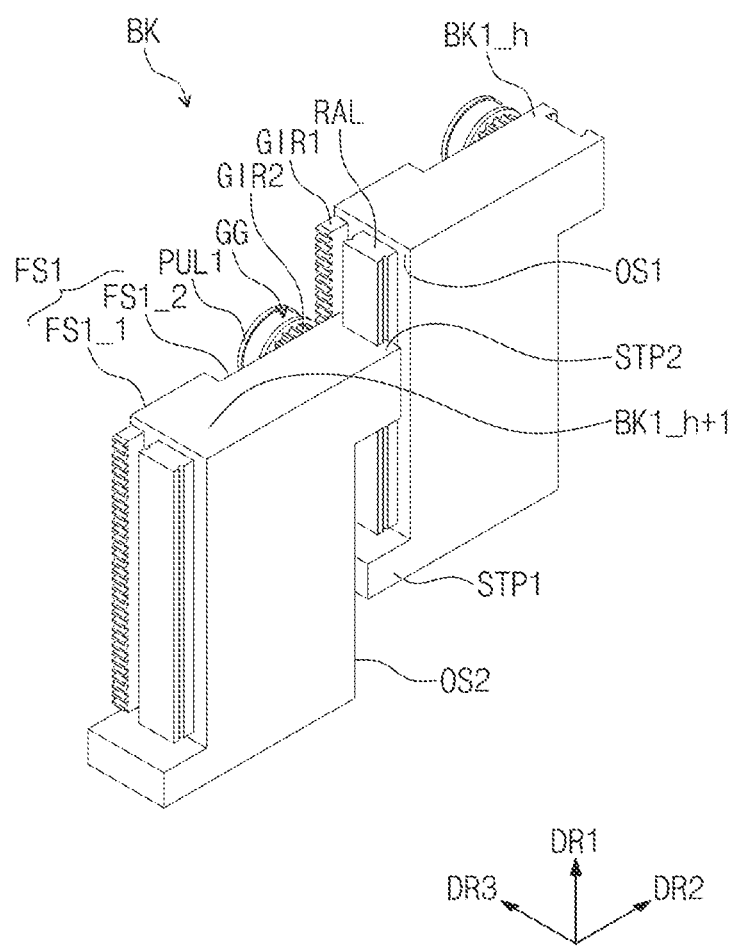
FIG. 20 is a rear perspective view of an embodiment of the first blocks illustrated in FIG. 19.
Figure 21:
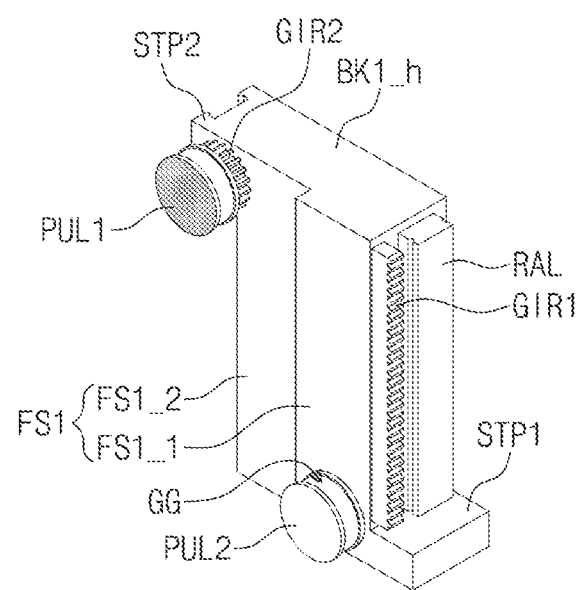
FIG. 21 is a view illustrating an embodiment of one of the first blocks illustrated in FIG. 19.
Figure 22:
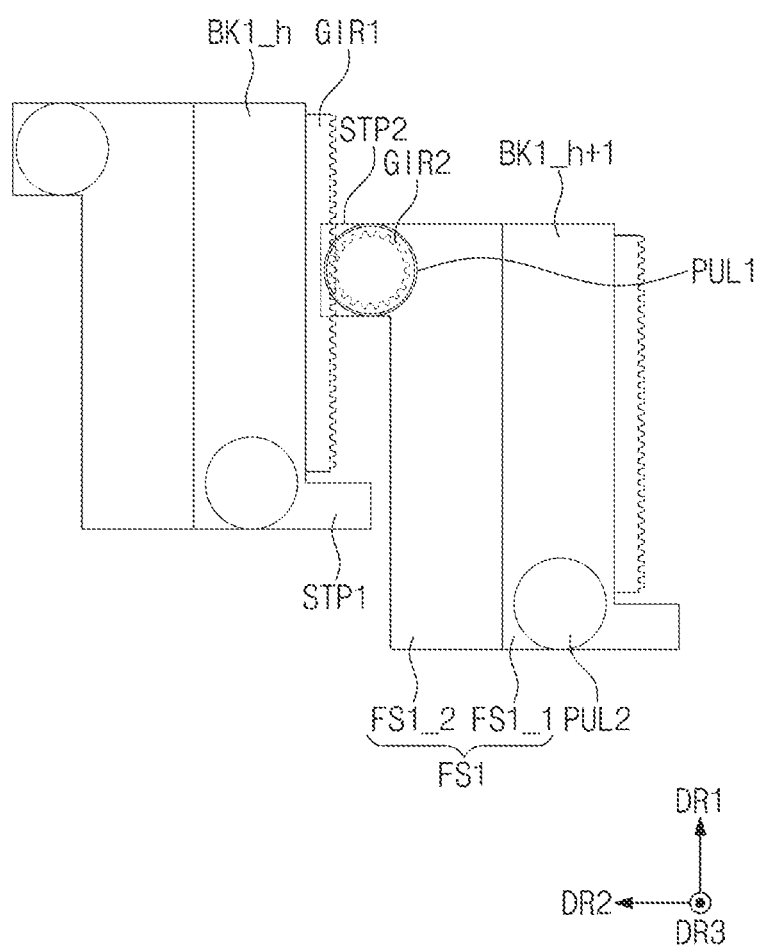
FIG. 22 is a side view of an embodiment of the first blocks illustrated in FIG. 19.

FIG. 19 is an enlarged front perspective view illustrating two first blocks BK1 which are adjacent to each other among the first blocks BK1 illustrated in FIG. 15. FIG. 20 is a rear perspective view of the first blocks BK1 illustrated in FIG. 19. FIG. 21 is a front perspective view illustrating one of the first blocks BK1 illustrated in FIG. 19. FIG. 22 is a front planar view of the first blocks BK1 illustrated in FIG. 19.

Hereinafter, the structures of the first gear GIR1 connected to the $h^{th}$ first block BK1_$h$, the second gear GIR2 connected to the $(h+1)^{th}$ first block BK1_$h$+1, a rail part RAL (e.g., a rail) connected to the $h^{th}$ first block BK1_$h$, the first and second pulleys PUL1 and PUL2 connected to the $(h+1)^{th}$ first block BK1_$h$+1, the first stopper STP1 protruding from the $h^{th}$ first block BK1_$h$, and the second stopper STP2 protruding from the $(h+1)^{th}$ first block BK1_$h$+1 will be mainly described.

Referring to FIGS. 19 to 22, the two first blocks BK1 are defined as the $h^{th}$ first block BK1_$h$ and the $(h+1)^{th}$ first block BK1_$h$+1. "h" is a natural number. The second gear GIR2 connected to the $(h+1)^{th}$ first block BK1_$h$+1 may be disposed to be engaged with the first gear GIRT connected to the $h^{th}$ first block BK1_$h$. The second gear GIR2 may be movable along the first gear GIRT, along the first direction DR1.

The first gear GIRT may include a linear gear, and the second gear GIR2 may include a circular gear. In an embodiment, for example, the first gear GIRT may extend in the first direction DR1. The first gear GIRT may be disposed on a side surface OS1 of the $h^{th}$ first block BK1_$h$ that faces the $(h+1)^{th}$ first block BK1_$h$+1 and may be connected to the side surface OS1 of the h$^{th}$ first block BK1_h. The first gear GIRT may protrude from the side surface OS1 of the h$^{th}$ first block BK1_h which is closest to the (h+1)$^{th}$ first block BK1_h+1, to be connected to the side surface OS1 of the h$^{th}$ first block BK1_h. An opposite surface of the first gear GIRT that faces away from the side surface OS1 may have a saw tooth shape extending in the first direction DRT.

The second gear GIR2 may have a circular shape when viewed in the third direction DR3, and the outer circumferential surface of the second gear GIR2 may have the shape of a toothed wheel. The second gear GIR2 may be engageable with the first gear GIR1 in the second direction DR2. The toothed wheel of the second gear GIR2 may be disposed to be engaged with the saw teeth of the first gear GIRT. The second gear GIR2 may rotate about an axis of rotation parallel to the third direction DR3 to move the first gear GIRT in the first direction DRT.

The lifting part ELP may further include the rail part RAL and the first and second stoppers STP1 and STP2. The rail part RAL may extend in the first direction DRT and may be spaced apart from the first gear GIRT in the third direction DR3. The rail part RAL may be disposed on the side surface OS1 of the h$^{th}$ first block BK1_h and may be connected to the side surface OS1 of the h$^{th}$ first block BK1_h.

The (h+1)$^{th}$ first block BK1_h+1 may be coupled to the rail part RAL to move in the first direction DR1. That is, the (h+1)$^{th}$ first block BK1_h+1 may be engaged with the rail part RAL to be slidable along the rail part RAL along the first direction DR1. A side surface OS2 of the (h+1)$^{th}$ first block BK1_h+1 that faces the side surface OS1 of the h$^{th}$ first block BK1_h may be coupled to the rail part RAL. The side surface OS1 of the h$^{th}$ first block BK1_h and the side surface OS2 of the (h+1)$^{th}$ first block BK1_h+1 may be adjacent to each other (e.g., closet to and facing each other) in the second direction DR2.

Substantially, the side surface OS2 of the (h+1)$^{th}$ first block BK1_h+1 may be coupled to the rail part RAL by the second stopper STP2 extending from a plane of the side surface OS2 and toward the rail part RAL. Accordingly, the side surface OS1 of the h$^{th}$ first block BK1_h and the side surface OS2 of the (h+1)$^{th}$ first block BK1_h+1 facing each other in the second direction DR2 may be coupled with each other to reciprocate in the first direction DR1.

The first left center-block CBK1 and the first block BK1 which is adjacent to the first left center-block CBK1 illustrated in FIG. 15 may also be coupled in the same structure as the h$^{th}$ first block BK1_h and the (h+1)$^{th}$ first block BK1_h+1. The leftmost first block BK1 and the first block BK1 which is adjacent to the leftmost first block BK1 may also be coupled in the same structure as the h$^{th}$ first block BK1_h and the (h+1)$^{th}$ first block BK1_h+1. According to this structure, side surfaces of blocks BK facing each other in the second direction DR2 among the blocks BK illustrated in FIGS. 12 and 13 may be coupled to reciprocate in the first direction DR1.

The lifting part ELP may further include the first stopper STP1 protruding from the h$^{th}$ first block BK1_h and the second stopper STP2 protruding from the (h+1)$^{th}$ first block BK1_h+1. The first stopper STP1 may protrude from the lower end of the side surface OS1 of the h$^{th}$ first block BK1_h in the second direction DR2. The first gear GIRT and the rail part RAL may be disposed over the first stopper STP1.

The second stopper STP2 may protrude from the upper end of the side surface OS2 of the (h+1)$^{th}$ first block BK1_h+1 in the second direction DR2. The second stopper STP2 may overlap the first stopper STP1 when viewed in the first direction DR1. The second stopper STP2 may be coupled to the rail part RAL to move along the rail part RAL in the first direction DR1.

Likewise to the h$^{th}$ first block BK1_h and the (h+1)$^{th}$ first block BK1_h+1, the first left center-block CBK1 and the first blocks BK1 illustrated in FIG. 15 may have the first and second stoppers STP1 and STP2 defined thereon.

The second gear GIR2 may be connected to the second stopper STP2. The second gear GIR2 may extend from a respective first block BK1 at the second stopper STP2 thereof. The second gear GIR2 may be disposed on an outer side surface of the second stopper STP2 opposite to each other the third direction DR3 and may be engaged with the first gear GIRT. The outer side surface of the second stopper STP2 may be defined as a portion of the front surface FS1 of the (h+1)$^{th}$ first block BK1_h+1.

The front surface FS1 may be formed with a step. In an embodiment, for example, the first surface FS1 may include a first front surface FS1_1 and a second front surface FS1_2 which is in a lower position than the first front surface FS1_1 (e.g., further from the display module DM than the first front surface FS1_1 to be disposed in different planes from each other). The second front surface FS1_2 may include the outer side surface of the second stopper STP2. The second gear GIR2 may be disposed protruded from the second front surface FS1_2 at the second stopper STP2. Likewise to the front surface FS1 of the (h+1)$^{th}$ first block BK1_h+1 illustrated in FIG. 19, the front surface FS1 of the first left center-block CBK1 illustrated in FIG. 15 may be formed with a step.

The first pulley PUL1 may be adjacent to the upper end of the (h+1)$^{th}$ first block BK1_h+1. The first pulley PUL1 may be disposed over the outer side surface of the second stopper STP2. The first pulley PUL1 may be disposed on or connected to the second gear GIR2. The first pulley PUL1 may extend from the second gear GIR2 in the third direction DR3. The first pulley PUL1 may overlap the second gear GIR2 when viewed in the third direction DR3. The first pulley PUL1 may be connected to the (h+1)$^{th}$ first block BK1_h+1 through the second gear GIR2.

The second pulley PUL2 may be connected to the (h+1)$^{th}$ first block BK1_h+1. The second pulley PUL2 may be disposed on the first front surface FS1_1 and may be connected to the first front surface FS1_1. As the second gear GIR2 is disposed on the second front surface FS1_2 in a lower position than the first front surface FS1_1 along the third direction DR3, and the first pulley PUL1 is disposed on the second gear GIR2, the second pulley PUL2 may be disposed on the same plane as the first pulley PUL1 (e.g., coplanar with each other). The second pulley PUL2 may be spaced apart from the first pulley PUL1 along both the first and second directions DR1 and DR2, and may be adjacent to the lower end of the (h+1)$^{th}$ first block BK1_h+1.

The first pulley PUL1 and the second pulley PUL2 may have guide grooves GG defined thereon, respectively. The guide grooves GG may be defined at the outer circumferential surfaces of the first and second pulleys PUL1 and PUL2, respectively. The first and second dummy pulleys DPL1 and DPL2 illustrated in FIGS. 12 and 13 may have substantially the same structure as the second pulley PUL2.

Figure 23:
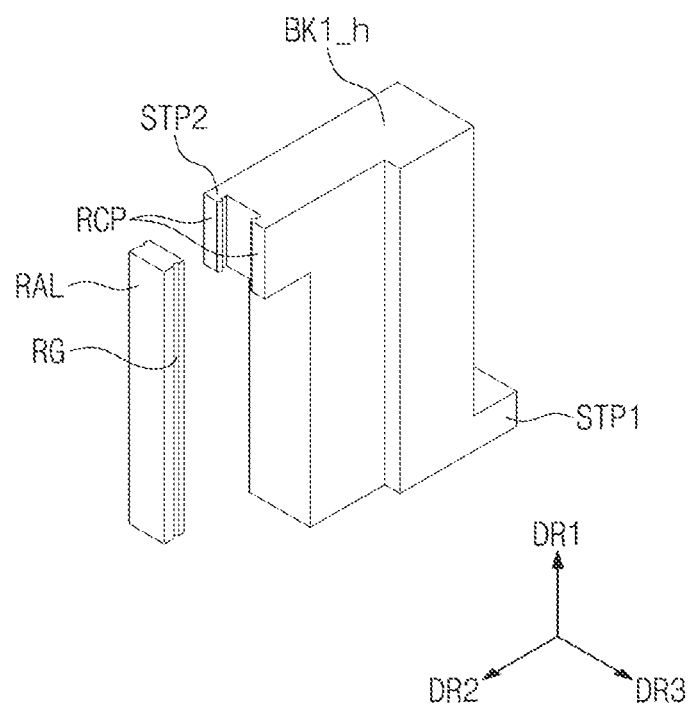
FIGS. 23 and 24 are views illustrating an embodiment of a rail part illustrated in FIG. 19 and rail coupling parts coupled to the rail part.
Figure 24:
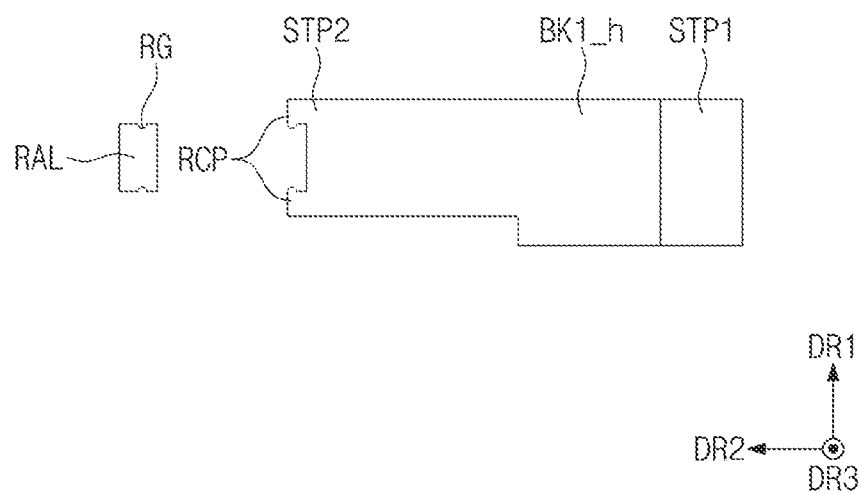

FIGS. 23 and 24 are views illustrating an embodiment of the rail part RAL illustrated in FIG. 19 and rail coupling parts RCP coupled to the rail part.

For convenience of description, the first and second gears GIR1 and GIR2 and the first and second pulleys PUL1 and PUL2 are omitted in FIGS. 23 and 24.

Referring to FIGS. 23 and 24, the rail coupling parts RCP may protrude from the second stopper STP2. The rail coupling parts RCP may protrude toward the rail part RAL from opposite sides of the second stopper STP2 opposite to each other in the third direction DR3. The rail coupling parts RCP may have a shape similar to a hook. The rail coupling parts RCP may be spaced apart from each other along the third direction DR3 and define a rail receiving groove therebetween. A portion of the rail part RAL may engage with the first block BK1 at the rail receiving groove.

The rail coupling parts RCP may be inserted into and engage with rail grooves RG that are defined on opposite side surfaces of the rail part RAL opposite to each other in the third direction DR3 and that extend in the first direction DR1. The rail coupling parts RCP may move in the first direction DR1 along the rail grooves RG. A distal end of the fail part RAL which extends from the rail grooves RG and toward the rail receiving groove may have a shape corresponding to a shape of the rail receiving groove. The rail part RAL may be slidable in the rail receiving groove, along the first direction DR1.

The first and second gears GIR1 and GIR2 may be engaged with each other and may move relative to each other in the first direction DR1, and the rail coupling parts RCP may be inserted into the rail grooves RG and may be movable relative to each other in the first direction DR1. According to this structure, the first blocks BK1 and the first center block CBK1 may be coupled to be movable relative to each other in the first direction DR1, and the second blocks BK2 and the second center block CBK2 may be coupled to be moveable relative to each other in the first direction DR1.

Figure 25:
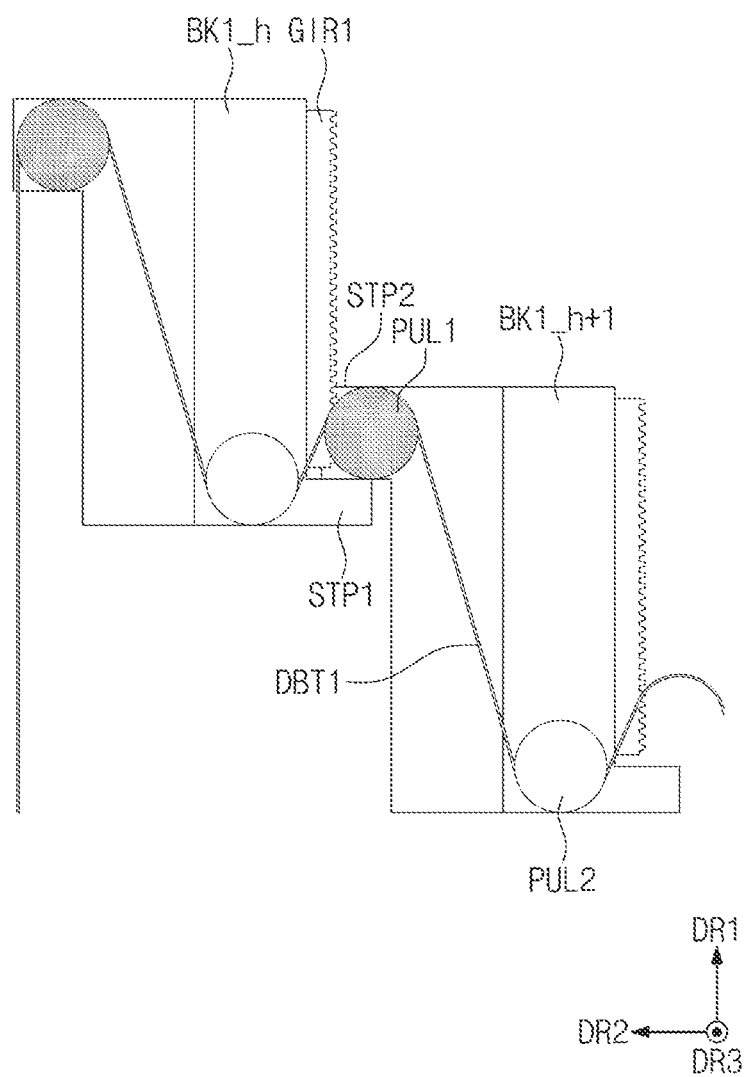
FIGS. 25 and 26 are views illustrating an embodiment of a first stopper and a second stopper illustrated in FIG. 19 which are in contact with each other.
Figure 26:
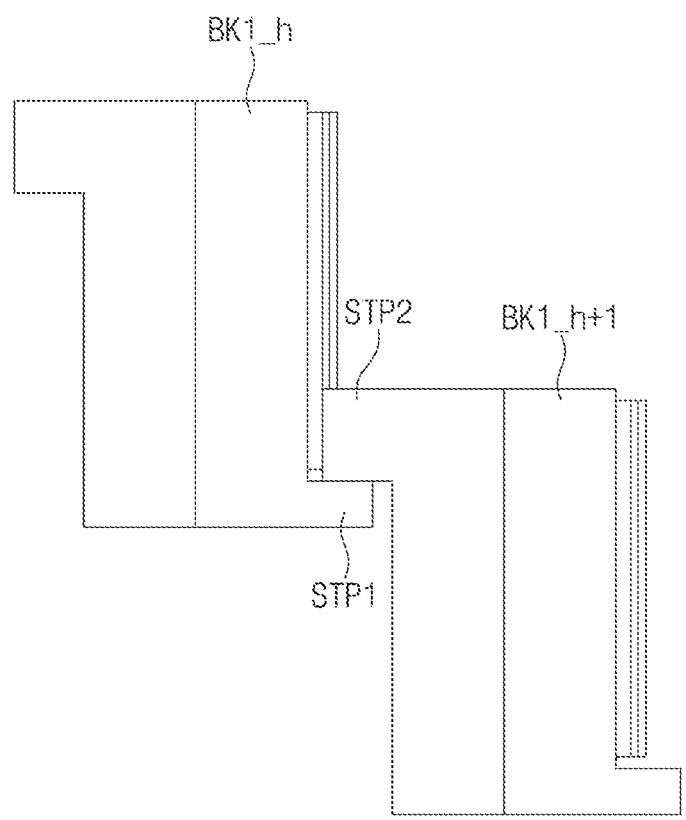

FIGS. 25 and 26 are views illustrating an embodiment of the first stopper STP1 and the second stopper STP2 illustrated in FIG. 19 which are in contact with each other.

To more clearly illustrate the first and second stoppers STP1 and STP2, the first and second gears GIRT and GIR2, the first drive belt DBT1, and the first and second pulleys PUL1 and PUL2 are omitted in FIG. 26.

Referring to FIGS. 25 and 26, when the $h^{th}$ first block BK1_$h$ and the $(h+1)^{th}$ first block BK1_$h$+1 move toward each other along the first direction DR1, the second stopper STP2 may make contact with the first stopper STP1. Accordingly, the $h^{th}$ first block BK1_$h$ and the $(h+1)^{th}$ first block BK1_$h$+1 may no longer move toward each other along the first direction DR1. The amounts of movement of the $h^{th}$ first block BK1_$h$ and the $(h+1)^{th}$ first block BK1_$h$+1 in the first direction DR1 may be limited by the first stopper STP1 and the second stopper STP2.

Figure 27:
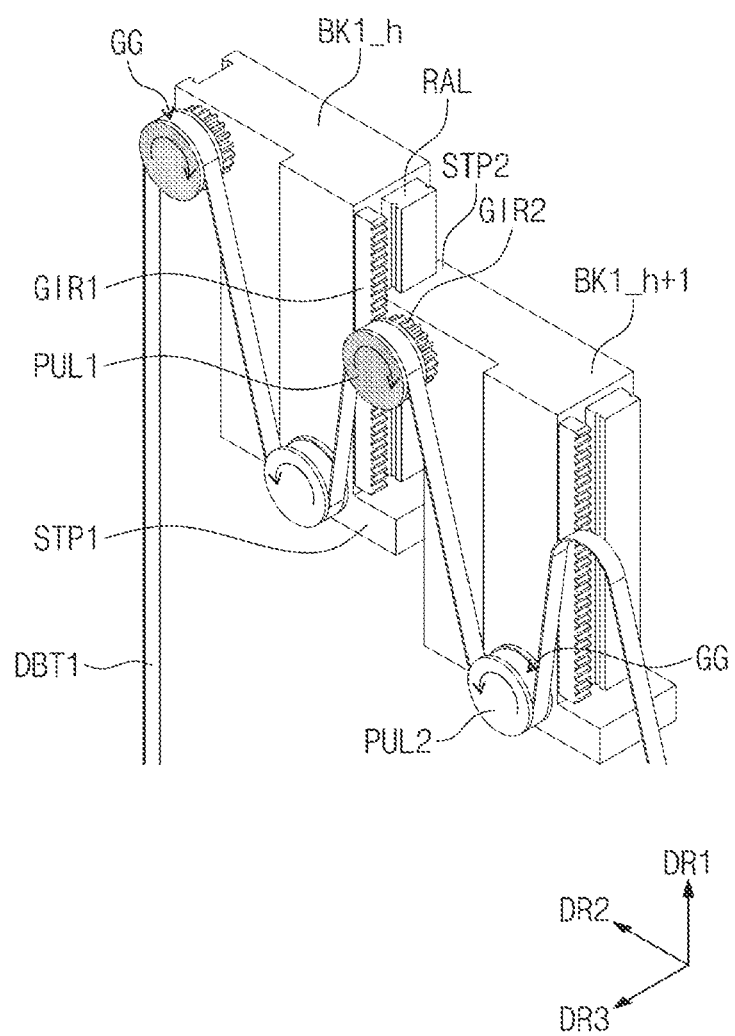
FIGS. 27 and 28 are views for explaining an embodiment of an operation in which the first blocks illustrated in FIG. 19 move upward in a first direction.
Figure 28:
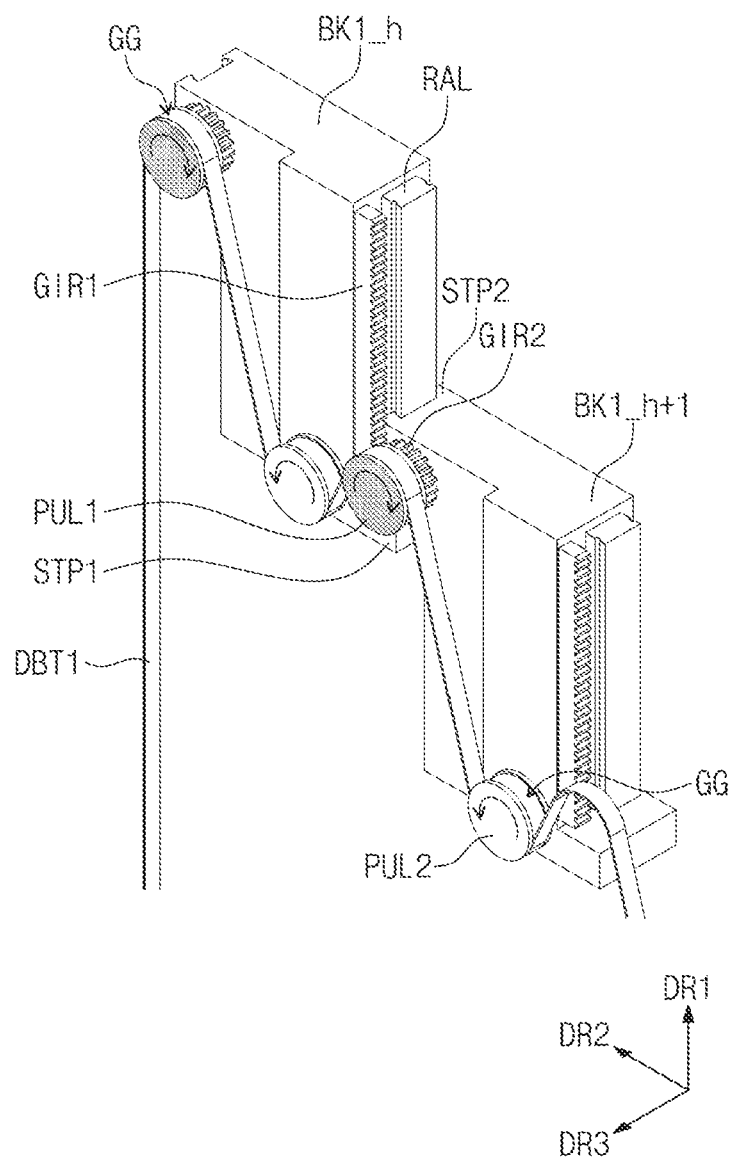
Figure 29:
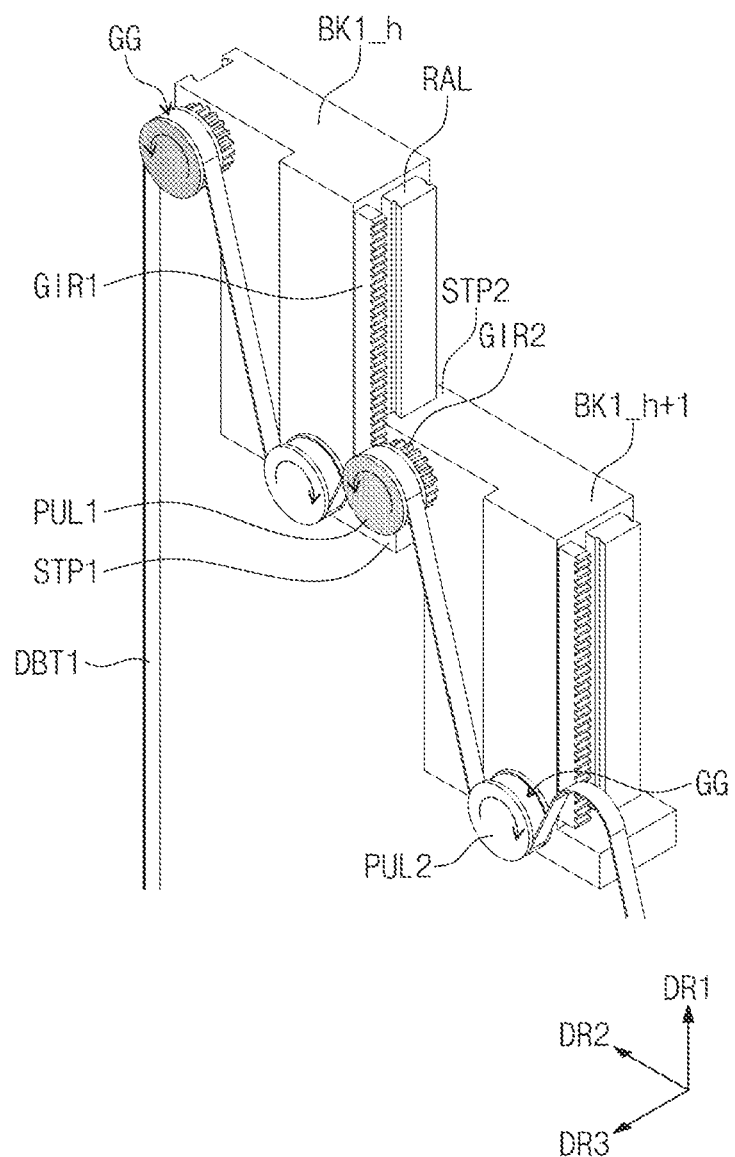
FIGS. 29 and 30 are views for explaining an operation in which the first blocks illustrated in FIG. 19 move downward in the first direction.
Figure 30:
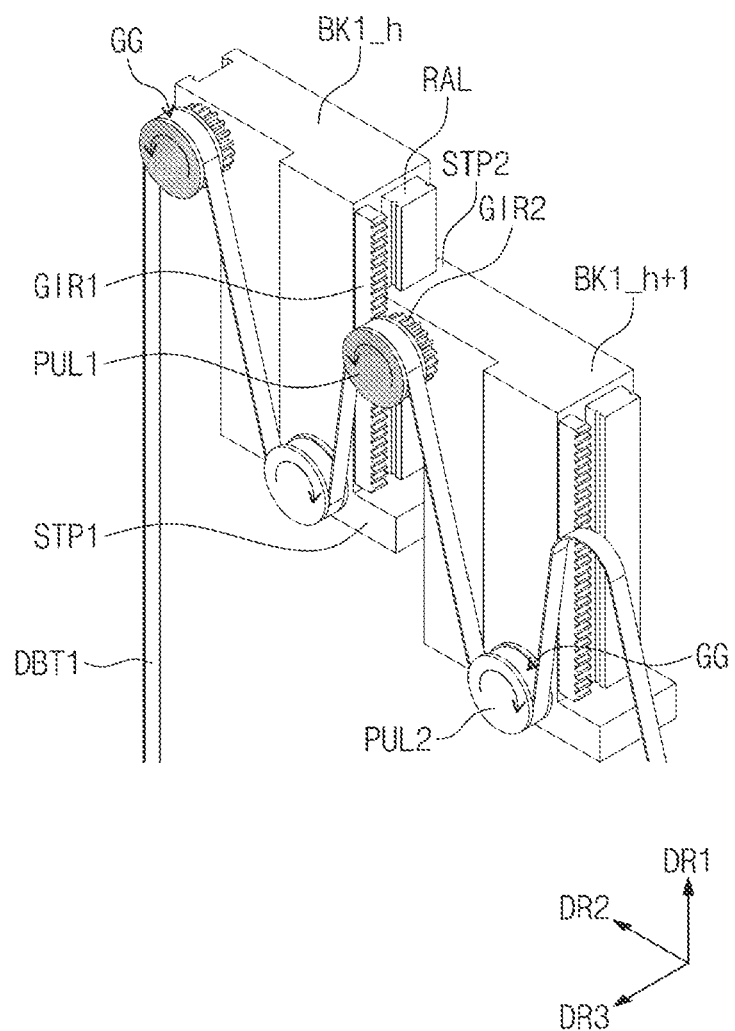

FIGS. 27 and 28 are views for explaining an embodiment of an operation in which the first blocks BK1 illustrated in FIG. 19 move upward together with each other in the first direction DR1, relative to the bottom part BP. FIGS. 29 and 30 are views for explaining an embodiment of an operation in which the first blocks BK1 illustrated in FIG. 19 move downward together with each other along the first direction DR1, relative to the bottom part BP.

Referring to FIGS. 27 and 28, the first drive belt DBT1 may be connected to the first pulley PUL1 and the second pulley PUL2 so as to be bent in opposite directions along the first direction DR1, with respect to the first pulley PUL1 and the second pulley PUL2. In an embodiment, for example, the first drive belt DBT1 may be disposed on an upper curved surface of the first pulley PUL1 and may be bent along the first pulley PUL1 so as to be convex upward in the first direction DR1. Furthermore, the first drive belt DBT1 may be disposed on a lower curved surface of the second pulley PUL2 and may be bent along the second pulley PUL2 so as to be convex downward in a direction opposite to the first direction DR1 shown in FIGS. 27 and 29. Accordingly, the first pulley PUL1 and the second pulley PUL2 may be rotated in opposite directions by travel of the first drive belt DBT1 along the pulleys.

The first drive belt DBT1 may be disposed in the guide grooves GG defined at the first and second pulleys PUL1 and PUL2. Accordingly, the first drive belt DBT1 may be more stably disposed along an outer curved surface of the first and second pulleys PUL1 and PUL2.

The second gear GIR2 may be connected to the first drive belt DBT1 through the first pulley PUL1. Torque may be transmitted to the first pulley PUL1 and the second pulley PUL2, by the first drive belt DBT1 commonly engaged with both the first pulley PUL1 and the second pulley PUL2. The first drive belt DBT1 may transmit a driving force to the second gear GIR2 through the first pulley PUL1. Torque may be transmitted to the first pulley PUL1 by the first drive belt DBT1, and the torque of the first pulley PUL1 may be transmitted to the second gear GIR2.

Referring to FIGS. 13, 27, and 28, the first drive roller DRL1 may rotate in the clockwise direction, and the torque of the first drive roller DRL1 may be transmitted to the first and second pulleys PUL1 and PUL2 through the first drive belt DBT1. When the first drive roller DRL1 rotates in the clockwise direction, the first pulley PUL1 may rotate in the clockwise direction, and the second pulley PUL2 may rotate in the counterclockwise direction.

The second gear GIR2 may rotate in the clockwise direction by the first pulley PUL1 and may move downward along the first direction DR1 along the first gear GIRT, and the second stopper STP2 may move downward along the first direction DR1 along the rail part RAL. In this case, the $h^{th}$ first block BK1_$h$ and the $(h+1)^{th}$ first block BK1_$h$+1 may move away from each other in opposite directions along the first direction DR1. That is, although the $h^{th}$ first block BK1_$h$ and the $(h+1)^{th}$ first block BK1_$h$+1 move upward together with each other in the first direction DR1, relative to the bottom part BP, the respective blocks move in directions opposite to each other.

Referring to FIG. 28, movement of the $h^{th}$ first block BK1_$h$ and the $(h+1)^{th}$ first block BK1_$h$+1 which are moving in opposite directions from each other along the first direction DR1 may stop when the first stopper STP1 and the second stopper STP2 make contact with each other.

Referring to FIGS. 13, 29, and 30, the first drive roller DRL1 may rotate in the counterclockwise direction. When the first drive roller DRL1 rotates in the counterclockwise direction, the first pulley PUL1 may rotate in the counterclockwise direction, and the second pulley PUL2 may rotate in the clockwise direction.

The second gear GIR2 may rotate in the counterclockwise direction by the first pulley PUL1 and may move upward along the first direction DR1 along the first gear GIR1, and the second stopper STP2 may move upward along the first direction DR1 along the rail part RAL. In this case, the $h^{th}$ first block BK1_$h$ and the $(h+1)^{th}$ first block BK1_$h$+1 may move toward each other along the first direction DR1. That is, although the $h^{th}$ first block BK1_$h$ and the $(h+1)^{th}$ first block BK1_$h$+1 move downward together with each other along the first direction DR1, relative to the bottom part BP, the respective blocks move in toward each other.

Referring to FIG. 30, movement of the $h^{th}$ first block BK1_$h$ and the $(h+1)^{th}$ first block BK1_$h$+1 toward each other along the first direction DR1 may increase a distance between the first and second stoppers STP1 and STP2 along the first direction DR1.

Figure 31:
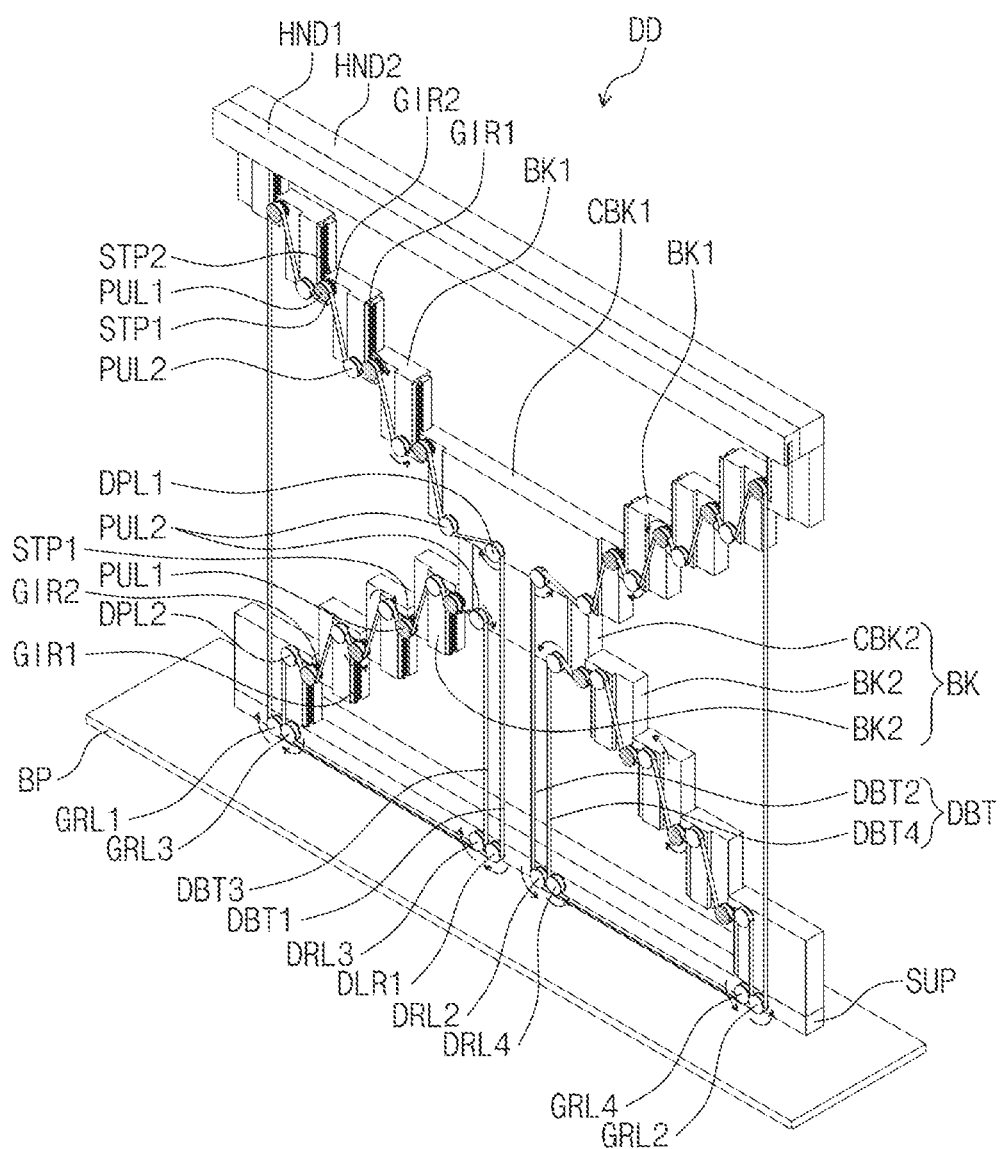
FIG. 31 is a view illustrating an embodiment of rotations of drive rollers for moving blocks illustrated in FIG. 13 away from each other.

FIG. 31 is a view illustrating an embodiment of rotation directions of the drive rollers DRL for moving the blocks BK illustrated in FIG. 13 in a direction away from each other. Movement of the blocks BK illustrated in FIG. 13 in a direction away from each other may extend the display module DM out of the housing HS (FIG. 1. taken together with FIGS. 4 and 5, for example).

Referring to FIG. 31, the first drive roller DRL1 and the third drive roller DRL3 may rotate in the clockwise direction, and the second drive roller DRL2 and the fourth drive roller DRL4 may rotate in the counterclockwise direction.

Torques of the first, second, third, and fourth drive rollers DRL1, DRL2, DRL3, and DRL4 may be transmitted to the first and second pulleys PUL1 and PUL2, the first and second dummy pulleys DPL1 and DPL2, and the first, second, third, and fourth guide rollers GRL1, GRL2, GRL3, and GRL4 by the first, second, third, and fourth drive belts DBT1, DBT2, DBT3, and DBT4.

The first dummy pulley DPL1 connected to the first drive belt DBT1 may rotate in the clockwise direction. The second pulleys PUL2 connected to the first drive belt DBT1 may rotate in the counterclockwise direction. The first pulleys PUL1 connected to the first drive belt DBT1 may rotate in the clockwise direction. The first guide roller GRL1 connected to the first drive belt DBT1 may rotate in the clockwise direction.

The first dummy pulley DPL1 connected to the second drive belt DBT2 may rotate in the counterclockwise direction. The second pulleys PUL2 connected to the second drive belt DBT2 may rotate in the clockwise direction. The first pulleys PUL1 connected to the second drive belt DBT2 may rotate in the counterclockwise direction. The second guide roller GRL2 connected to the second drive belt DBT2 may rotate in the counterclockwise direction.

The second pulleys PUL2 connected to the third drive belt DBT3 may rotate in the clockwise direction. The first pulleys PUL1 connected to the third drive belt DBT3 may rotate in the counterclockwise direction. The second dummy pulley DPL2 connected to the third drive belt DBT3 may rotate in the clockwise direction. The third guide roller GRL3 connected to the third drive belt DBT3 may rotate in the clockwise direction.

The second pulleys PUL2 connected to the fourth drive belt DBT4 may rotate in the counterclockwise direction. The first pulleys PUL1 connected to the fourth drive belt DBT4 may rotate in the clockwise direction. The second dummy pulley DPL2 connected to the fourth drive belt DBT4 may rotate in the counterclockwise direction. The fourth guide roller GRL4 connected to the fourth drive belt DBT4 may rotate in the counterclockwise direction.

The first blocks BK1 and the first center block CBK1 may move away from each other along the first direction DR1, and the second blocks BK2 and the second center block CBK2 may move away from each other along the first direction DR1. The amounts of movement of the first blocks BK1 and the first center block CBK1 in opposing directions along the first direction DR1 may be limited by the first and second stoppers STP1 and STP2. The amounts of movement of the second blocks BK2 and the second center block CBK2 in opposing directions along the first direction DR1 may be limited by the first and second stoppers STP1 and STP2.

The distances along the first direction DR1 between the first blocks BK1 and the second blocks BK2 may be increased as the respective blocks are farther away from the first and second center blocks CBK1 and CBK2 along the second direction DR2. According to this structure, the first and second center blocks CBK1 and CBK2 and the first and second blocks BK1 and BK2 may be arranged in the shape of "X" when the display module DM is unwound and extended out of the housing HS. A maximum distance between blocks BK and the bottom part BP may correspond to a full extension of the display module DM from the housing HS.

Figure 32:
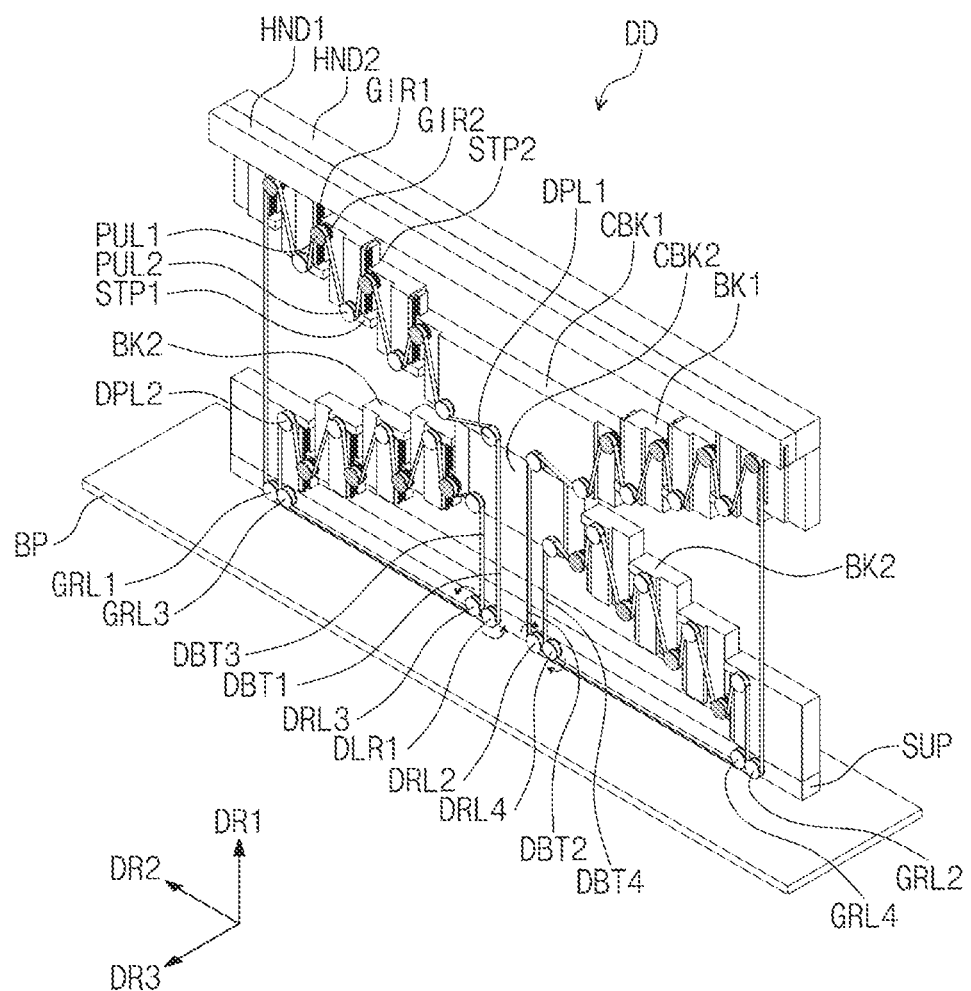
FIGS. 32 and 33 are views illustrating an embodiment of rotations of the drive rollers for moving the blocks illustrated in FIG. 13 toward each other.

FIGS. 32 and 33 are views illustrating an embodiment of rotation directions of the drive rollers DRL for moving the blocks BK illustrated in FIG. 13 toward each other. Movement of the blocks BK illustrated in FIG. 13 in a direction toward each other may retract the display module DM into the housing HS (FIG. 5. taken together with FIGS. 4 and 1, for example). FIG. 34 is a front view illustrating the first right blocks, the first right center-block, the second right blocks, and the second right center-block illustrated in FIG. 33.

Referring to FIGS. 32 and 33, the first drive roller DRL1 and the third drive roller DRL3 may rotate in the counterclockwise direction, and the second drive roller DRL2 and the fourth drive roller DRL4 may rotate in the clockwise direction.

Torques of the first, second, third, and fourth drive rollers DRL1, DRL2, DRL3, and DRL4 may be transmitted to the first and second pulleys PUL1 and PUL2, the first and second dummy pulleys DPL1 and DPL2, and the first, second, third, and fourth guide rollers GRL1, GRL2, GRL3, and GRL4 by the first, second, third, and fourth drive belts DBT1, DBT2, DBT3, and DBT4.

The rotational directions of the first and second pulleys PUL1 and PUL2, the first and second dummy pulleys DPL1 and DPL2, and the first, second, third, and fourth guide rollers GRL1, GRL2, GRL3, and GRL4 may be opposite to those in FIG. 31. In this case, the first blocks BK1 and the first center block CBK1 may move toward each other along the first direction DR1, and the second blocks BK2 and the second center block CBK2 may move toward each other along the first direction DR1.

Referring to FIGS. 33 and 34, when the display module DM is maximally wound, the first blocks BK1 and the first center block CBK1 may move toward each other along the first direction DR1, the first blocks BK1 and the first center block CBK1 may together move toward the bottom part BP along the first direction, and may finally be arranged adjacent to each other along the second direction DR2. The second blocks BK2 and the second center block CBK2 may move toward each other along the first direction DR1, the second blocks BK2 and the second center block CBK2 may together move toward the bottom part BP along the first direction, and may finally be arranged in the second direction DR2. The display module DM which is maximally wound may dispose the blocks BK fully collapsed within the housing HS and closest to the bottom part BP.

The first blocks BK1 and the first center block CBK1 which are aligned with each other along the second direction DR2 may be disposed over the second blocks BK2 and the second center block CBK2 which are aligned with each other along the second direction DR2, as illustrated in FIGS. 33 and 34. When the display module DM is maximally wound, movement of the first blocks BK1 toward the bottom part BP may be stopped by contact with the upper surfaces of the second blocks BK2. The second blocks BK2 and the second center block CBK2 which are aligned with each other along the second direction DR2 may serve to support the first blocks BK1 and the first center block CBK1 which are aligned with each other along the second direction DR2. The display module DM which is maximally wound may and the blocks BK which are fully collapsed may define fully retraction within the housing HS.

Movement of the second blocks BK2 and the second center block CBK2 toward the bottom part BP may be stopped by contact with the upper surface of the lower support part SUP. The lower support part SUP may serve to support the second blocks BK2 and the second center block CBK2 which are fully collapsed and aligned with each other along the second direction DR2.

Foldable links may be used instead of the blocks BK. Two foldable links may be connected to opposite ends of the second upper support part HND2, and the display module DM may be moved upward and downward along the first direction DR1 as the two foldable links are folded and unfolded in the first direction DR1. When the foldable links are used, the moving speeds of the left foldable link and the right foldable link in the up/down direction may not be accurately controlled, and therefore the moving speeds of the left and right sides of the display module DM in the up/down direction may differ from each other. In addition, it may be difficult to control the speed of rotation of the roller ROL, which winds and unwinds the display module DM, in accordance with the moving speeds of the foldable links in the up/down direction.

In an embodiment of the present disclosure, by controlling the speeds of rotation of the first to fourth drive rollers DRL1 to DRL4 to the same speed, the first and second pulleys PUL1 and PUL2, the second gears GIR2, and the first and second dummy pulleys DPL1 and DPL2 may be identically (or simultaneously) rotated by the first to fourth drive belts DBT1 to DBT4. Furthermore, movements of the blocks BK may be more accurately controlled because the blocks BK are moved by the first and second gears GIR1 and GIR2 implemented in the form of gears engaged with each other through saw teeth. Accordingly, the moving speeds of the blocks BK along the first direction DR1 may be identically and accurately controlled.

In addition, the drive parts DRP implemented with drive rollers DRL and the first to fourth drive rollers DRL1 to DRL4 may be accurately controlled such that the speeds of rotation thereof match each other, as compared with when the foldable links are used.

Figure 35:
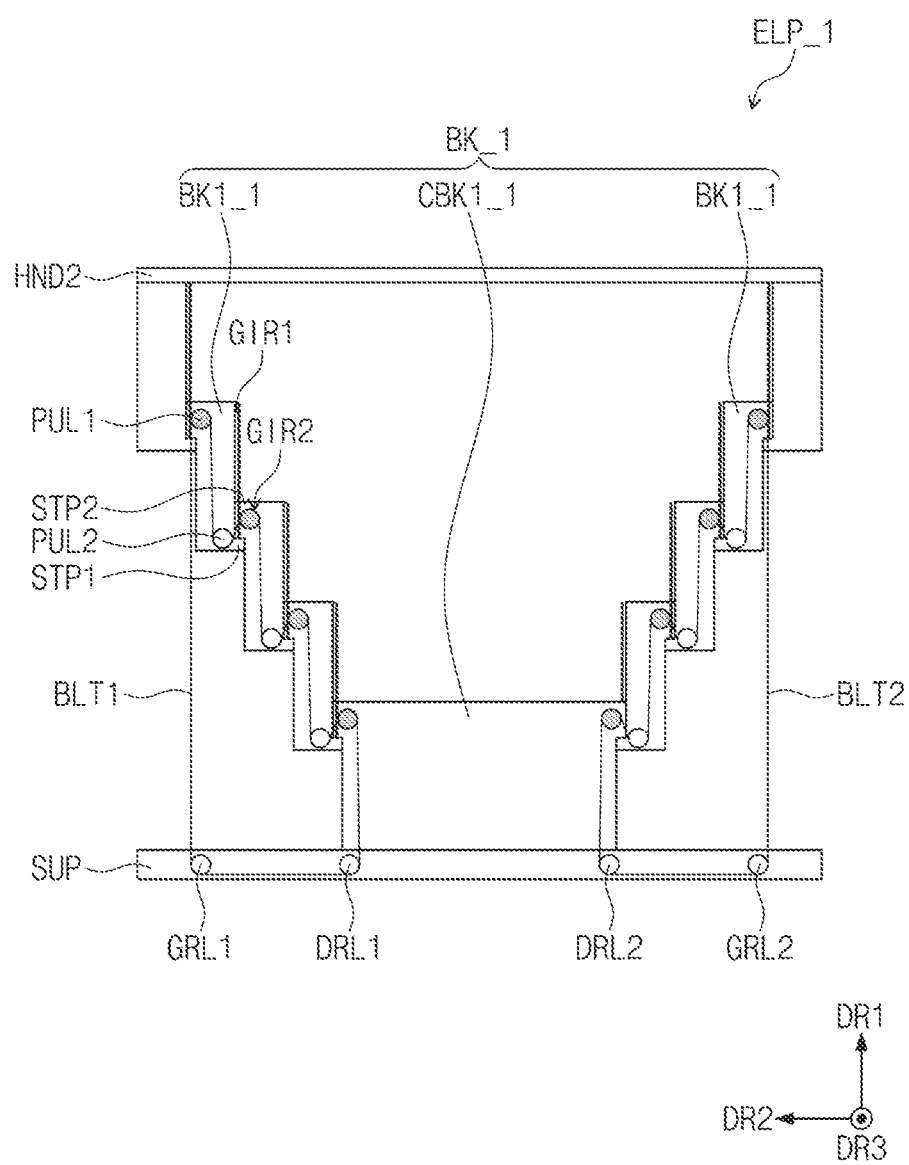
FIGS. 35 and 36 are views illustrating an embodiment of blocks of a display device.
Figure 36:
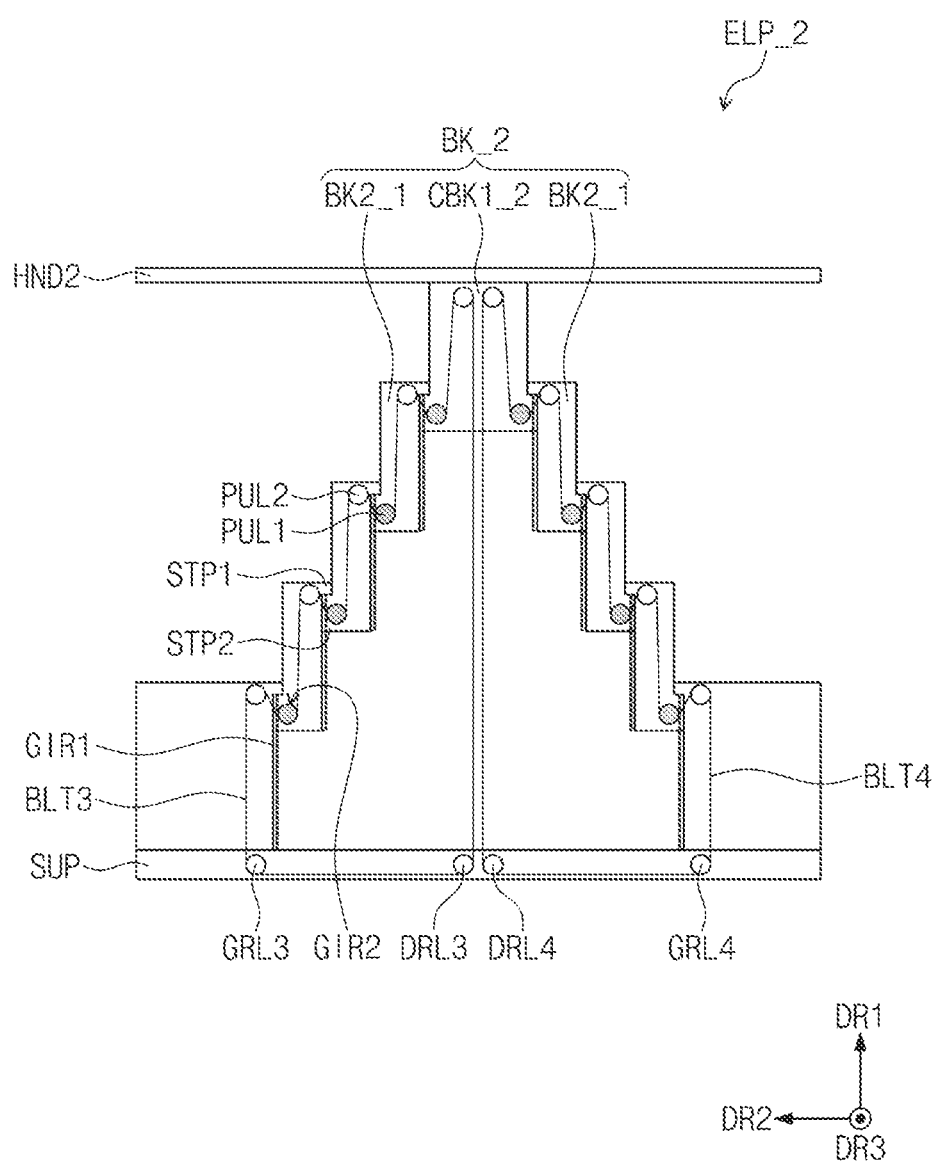

FIGS. 35 and 36 are views illustrating configurations of embodiments of blocks BK.

In FIGS. 35 and 36, the front sides of the blocks BK_1 and BK_2 are illustrated.

Referring to FIG. 35, a lifting part ELP_1 may include the plurality of blocks BK_1, a plurality of first and second gears GIR1 and GIR2 engageable with each other, a plurality of first and second pulleys PUL1 and PUL2, a plurality of drive belts BLT1 and BLT2, a plurality of drive rollers DRL1 and DRL2, a plurality of guide rollers GRL1 and GRL2, and a plurality of stoppers STP1 and STP2.

The blocks BK_1 may include a first center block CBK1_1 and a plurality of first blocks BK1_1 which are grouped to be respectively coupled to the opposite sides of the first center block CBK1_1 which area opposite to each other in the second direction DR2. The first center block CBK1_1 and the first blocks BK1_1 may be coupled to move relative to each other in the first direction DR1. The first center block CBK1_1 may be connected to the lower support part SUP, and the leftmost and rightmost first blocks BK1_1 may be connected to the second upper support part HND2.

The structure of the blocks BK_1 illustrated in FIG. 35 may be substantially the same as the connecting structure of the first center block CBK1 and the first blocks BK1 in FIG. 13, except that the first dummy pulley DPL1 and the second pulley PUL2 are not disposed on the first center block CBK1_1.

Furthermore, the first and second gears GIR1 and GIR2, the first and second pulleys PUL1 and PUL2, the drive belts BLT1 and BLT2, the drive rollers DRL1 and DRL2, the guide rollers GRL1 and GRL2, and the stoppers STP1 and STP2 may be substantially the same as the first and second gears GIR1 and GIR2, the first and second pulleys PUL1 and PUL2, the drive belts BLT1 and BLT2, the drive rollers DRL1 and DRL2, the guide rollers GRL1 and GRL2, and the stoppers STP1 and STP2 of the above-described lifting part ELP.

Referring to FIG. 36, a lifting part ELP_2 may include the plurality of blocks BK_2, a plurality of first and second gears GIR1 and GIR2, a plurality of first and second pulleys PUL1 and PUL2, a plurality of dummy pulleys DPL2, a plurality of drive belts BLT3 and BLT4, a plurality of drive rollers DRL3 and DRL4, a plurality of guide rollers GRL3 and GRL4, and a plurality of stoppers STP1 and STP2.

The blocks BK_2 may include a second center block CBK2_1 and a plurality of second blocks BK2_1 coupled to the opposite sides of the second center block CBK2_1 opposite to each other in the second direction DR2. The second center block CBK2_1 and the second blocks BK2_1 may be coupled to move relative to each other in the first direction DR1. The second center block CBK2_1 may be connected to the second upper support part HND2, and the leftmost and rightmost second blocks BK2_1 may be connected to the lower support part SUP.

The structure of the blocks BK_2 illustrated in FIG. 36 may be substantially the same as the connecting structure of the second center block CBK2 and the second blocks BK2 in FIG. 13, except that the second pulley PUL2 disposed on the second center block CBK2_1 is moved to a higher position.

Furthermore, the first and second gears GIR1 and GIR2, the first and second pulleys PUL1 and PUL2, the dummy pulleys DPL2, the drive belts BLT3 and BLT4, the drive rollers DRL3 and DRL4, the guide rollers GRL3 and GRL4, and the stoppers STP1 and STP2 may be substantially the same as the first and second gears GIR1 and GIR2, the first and second pulleys PUL1 and PUL2, the second dummy pulleys DPL2, the drive belts BLT3 and BLT4, the drive rollers DRL3 and DRL4, the guide rollers GRL3 and GRL4, and the stoppers STP1 and STP2 of the above-described lifting part ELP.

According to one or more embodiment of the present disclosure, the lifting part ELP may include the plurality of blocks BK disposed on and facing the rear surface BS of the display module DM, and movement of the blocks BK may be accurately and simultaneously controlled by the first and second gears GIR1 and GIR2, the first and second pulleys PUL1 and PUL2, and the drive belts DBT, which are coupled together. Accordingly, the display module DM may be more accurately raised and lowered relative to the housing HS.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
a display module;
a roller connected to a first end of the display module;
a plurality of blocks on a rear surface of the display module and connected to a second end of the display module opposite the first end;
a first gear connected to an $h^{th}$ block among the plurality of blocks;
a second gear connected to an $(h+1)^{th}$ block among the plurality of blocks and engaged with the first gear; and
a drive belt configured to transmit a driving force to the second gear,
wherein
'h' is a natural number, and
the first gear is connected to a side of the $h^{th}$ block facing the $(h+1)^{th}$ block.

2. The display device of claim 1, wherein
the first gear includes a linear gear, and the second gear includes a circular gear.

3. The display device of claim 1, wherein
the first end and the second end of the display module are opposite to each other along a first direction,
the first gear extends along the first direction, and
the second gear is engaged with the first gear in a second direction crossing the first direction and rotates to move the first gear along the first direction.

4. The display device of claim 3, wherein
the plurality of blocks are arranged along the second direction, and side surfaces of the plurality of blocks adjacent to each other in the second direction are coupled to move in the first direction.

5. The display device of claim 3, further comprising:
a rail extending along the first direction and spaced apart from the first gear along a third direction crossing a plane defined by the first and second directions,
wherein the first gear and the rail are connected to a side surface of the $h^{th}$ block adjacent to the $(h+1)^{th}$ block, and the $(h+1)^{th}$ block is coupled with the rail to move in the first direction.

6. The display device of claim 5, further comprising:
a first stopper protruding from a lower end of the side surface of the $h^{th}$ block; and
a second stopper protruding from an upper end of a side surface of the $(h+1)^{th}$ block adjacent to the $h^{th}$ block,
wherein the second stopper overlaps the first stopper when viewed in the first direction.

7. The display device of claim 6, further comprising:
a rail coupling part protruding from the second stopper and toward the rail, wherein the rail coupling part is inserted into rail grooves defined on opposite side surfaces of the rail opposite to each other in the third direction, the rail grooves extending in the first direction.

8. The display device of claim 6, wherein
the second gear is connected to one of opposite side surfaces of the second stopper opposite to each other in the third direction and is engaged with the first gear.

9. The display device of claim 5, further comprising:
a first pulley extending from the second gear, along the third direction; and
a second pulley connected to the $(h+1)^{th}$ block and spaced apart from the first pulley the second pulley being adjacent to a lower end of the $(h+1)^{th}$ block,
wherein the drive belt is connected to the first pulley and the second pulley so as to be bent in opposite directions with respect to the first pulley and the second pulley.

10. The display device of claim 9, wherein
the first pulley and the second pulley are rotated in opposite directions by the drive belt.

11. The display device of claim 9, wherein
the drive belt is in guide grooves defined on outer circumferential surfaces of the first pulley and the second pulley.

12. The display device of claim 9, further comprising a drive roller which is adjacent to the roller, and connected to the drive belt to move the drive belt.

13. The display device of claim 12, further comprising a guide roller which is adjacent to the roller and spaced apart from the drive roller along the second direction, the guide roller being connected to the drive belt,
wherein the drive belt has a closed loop shape and extends along the drive roller, the guide roller, and the first pulley and the second pulley.

14. The display device of claim 3, wherein the plurality of blocks include:
a first center block including opposing sides along the second direction;
a plurality of first blocks arranged along the second direction, from each of the opposing sides of the first center block;
a second center block adjacent to the first center block along the first direction, the second center block including opposing sides along the second direction; and
a plurality of second blocks arranged along the second direction, from each of the opposing sides of the second center block, and
wherein
the first center block and the plurality of first blocks are coupled to each other and movable relative to each other along in the first direction, and
the second center block and the plurality of second blocks are coupled to each other and movable relative to each other along the first direction.

15. The display device of claim 14, further comprising:
a lower support part; and
an upper support part disposed over the lower support part,
wherein the plurality of blocks are disposed between the lower support part and the upper support part, the second center block is connected to the first center block,
among the plurality of first blocks, a leftmost first block and a rightmost first block along the second direction are connected to the upper support part, and
among the plurality of second blocks, a leftmost second block and a rightmost second block along the second direction are connected to the lower support part.

16. The display device of claim 15, wherein
unwinding of the display module from the roller corresponds to:
movement of the plurality of first blocks in opposite directions from each other along the first direction,
movement of the plurality of second blocks in opposite directions from each other along the first direction, and
increase of distances along the first direction between:
the plurality of first blocks and the first center block, and
the plurality of second blocks and the second center block, and maximal winding the display module around the roller corresponds to:

the plurality of second blocks and the second center block in contact with the lower support part, along the first direction, and the plurality of first blocks in contact with the plurality of second blocks, along the first direction.

17. The display device of claim 14, wherein the plurality of first blocks are coupled to and arranged along the second direction from each of a first opposing side and a second opposing side among the opposing sides of the first center block, the plurality of second blocks are coupled to and arranged along the second direction from each of a first opposing side and a second opposing side among the opposing sides of the second center block, the plurality of first blocks coupled to the first opposing side of the first center block are symmetric to the plurality of first blocks coupled to the second opposing side of the first center block, and the plurality of second blocks coupled to the first opposing side of the second center block are symmetric to the plurality of second blocks coupled to the second opposing side of the second center block.

18. The display device of claim 3, further comprising:

a lower support part; and an upper support part disposed over the lower support part, wherein the plurality of blocks are disposed between the lower support part and the upper support part, wherein the plurality of blocks include:

a first center block; and a plurality of first blocks disposed on opposite sides of the first center block opposite to each other in the second direction, the plurality of first blocks being arranged in the second direction, wherein the first center block and the plurality of first blocks are coupled to each other and movable relative to each other along the first direction, the first center block is connected to the lower support part, and among the plurality of blocks, a leftmost first block and a rightmost first block along the second direction are connected to the upper support part.

19. The display device of claim 3, further comprising:

a lower support part; and an upper support part disposed over the lower support part, wherein the plurality of blocks are disposed between the lower support part and the upper support part, wherein the plurality of blocks include:

a second center block; and a plurality of second blocks coupled to opposite sides of the second center block opposite to each other in the second direction, the plurality of second blocks being arranged in the second direction, wherein the second center block and the plurality of second blocks are coupled to each other and movable relative to each other along the first direction, the second center block is connected to the upper support part, and among the plurality of blocks, a leftmost second block and a rightmost second block along the second direction are connected to the lower support part.

20. A display device comprising:

a display module;

a roller connected to a first end of the display module;

a plurality of blocks on a rear surface of the display module and connected to a second end of the display module opposite the first end;

a first gear connected to an $h^{th}$ block among the plurality of blocks; and a second gear connected to an $(h+1)^{th}$ block among the plurality of blocks and engaged with the first gear, wherein the first end and the second end of the display module are opposite to each other along a first direction, the first gear extends along the first direction, the second gear is engaged with the first gear in a second direction crossing the first direction and rotates to move the first gear along the first direction, 'h' is a natural number, and the first gear is connected to a side of the $h^{th}$ block facing the $(h+1)^{th}$ block.

21. The display device of claim 20, further comprising:

a pulley spaced apart from the second gear along the second direction and connected to the $(h+1)^{th}$ block; and a drive belt coupled to the second gear and the pulley and configured to rotate the second gear and the pulley such that the second gear and the pulley rotate in opposite directions.

22. The display device of claim 1, wherein the second gear is connected to a front surface of the $(h+1)^{th}$ block facing the display module.

* * * * *